(12) United States Patent
Asveren et al.

(10) Patent No.: US 11,729,263 B2
(45) Date of Patent: Aug. 15, 2023

(54) METHODS, APPARATUS AND SYSTEMS FOR CLOUD NATIVE APPLICATION MULTI-FACTOR LOAD BALANCING

(71) Applicant: Ribbon Communications Operating Company, Inc., Westford, MA (US)

(72) Inventors: Tolga Asveren, Bordentown, NJ (US); Shivakumar Venkataraman, Bengaluru (IN); Amol Sudhir Gogate, Pune (IN); Justin Hart, Purton (GB); Ashish Sharma, Bangalore (IN)

(73) Assignee: Ribbon Communications Operating Company, Inc., Westford, MA (US)

(*) Notice: Subject to any disclaimer, the term of this patent is extended or adjusted under 35 U.S.C. 154(b) by 0 days.

(21) Appl. No.: 17/482,407

(22) Filed: Sep. 22, 2021

(65) Prior Publication Data
US 2022/0094743 A1 Mar. 24, 2022

(30) Foreign Application Priority Data
Sep. 22, 2020 (IN) .............................. 202041041069

(51) Int. Cl.
*H04L 67/1014* (2022.01)
*H04L 67/1027* (2022.01)
*H04L 67/1008* (2022.01)
*H04L 67/142* (2022.01)
*H04L 67/141* (2022.01)

(52) U.S. Cl.
CPC ...... *H04L 67/1027* (2013.01); *H04L 67/1008* (2013.01); *H04L 67/1014* (2013.01); *H04L 67/141* (2013.01); *H04L 67/142* (2013.01)

(58) Field of Classification Search
CPC ............. H04L 67/1027; H04L 67/1008; H04L 67/1014; H04L 67/141; H04L 67/142
See application file for complete search history.

(56) References Cited

U.S. PATENT DOCUMENTS 10,541,855 B2    1/2020   Philip et al.
10,855,808 B1 * 12/2020  Mohanty ............ H04L 67/1014
(Continued)

FOREIGN PATENT DOCUMENTS

CN    101448240 A    6/2009
CN    104539558 A    4/2015

*Primary Examiner* — Ryan J Jakovac
(74) *Attorney, Agent, or Firm* — Straub & Straub; Stephen T. Straub; Michael P. Straub

(57) ABSTRACT

The present invention relates to communications methods and apparatus for session load balancing among session processing entities. An exemplary method embodiment includes the steps of receiving from a first device at a Signaling Front End Load Balancer (SLB) a first session initiation request destined for a second device; making a first session load balancing decision at the SLB with respect to the received first session initiation request; transmitting the first session initiation request to a first Session Border Controller (SBC) worker based on the first load balancing decision, the first SBC worker being one of a plurality of SBC workers forming a cluster of SBC workers, making a session mismatch determination at the first SBC worker with respect to a first session corresponding to the first session initiation request; and when the session mismatch determination is that a session mismatch has occurred notifying the SLB of the session mismatch.

21 Claims, 15 Drawing Sheets

(56) References Cited

U.S. PATENT DOCUMENTS

| | | | |
|---|---|---|---|
| 2002/0107026 A1 | 8/2002 | Agrawal et al. | |
| 2010/0046535 A1 | 2/2010 | Bugenhagen et al. | |
| 2014/0019622 A1 | 1/2014 | Khasnabish | |
| 2015/0229562 A1 | 8/2015 | Jenkins | |
| 2017/0163537 A1* | 6/2017 | Peterson | H04L 67/1025 |
| 2018/0227165 A1* | 8/2018 | Philip | H04L 47/748 |
| 2019/0052707 A1* | 2/2019 | Wikoff | H04L 65/1069 |
| 2020/0042362 A1* | 2/2020 | Cui | G06T 1/20 |
| 2021/0058455 A1* | 2/2021 | Kozhaya | H04L 47/805 |
| 2022/0035650 A1* | 2/2022 | Banerjee | H04L 12/4641 |
| 2022/0318071 A1* | 10/2022 | Zhong | G06F 9/5083 |

* cited by examiner

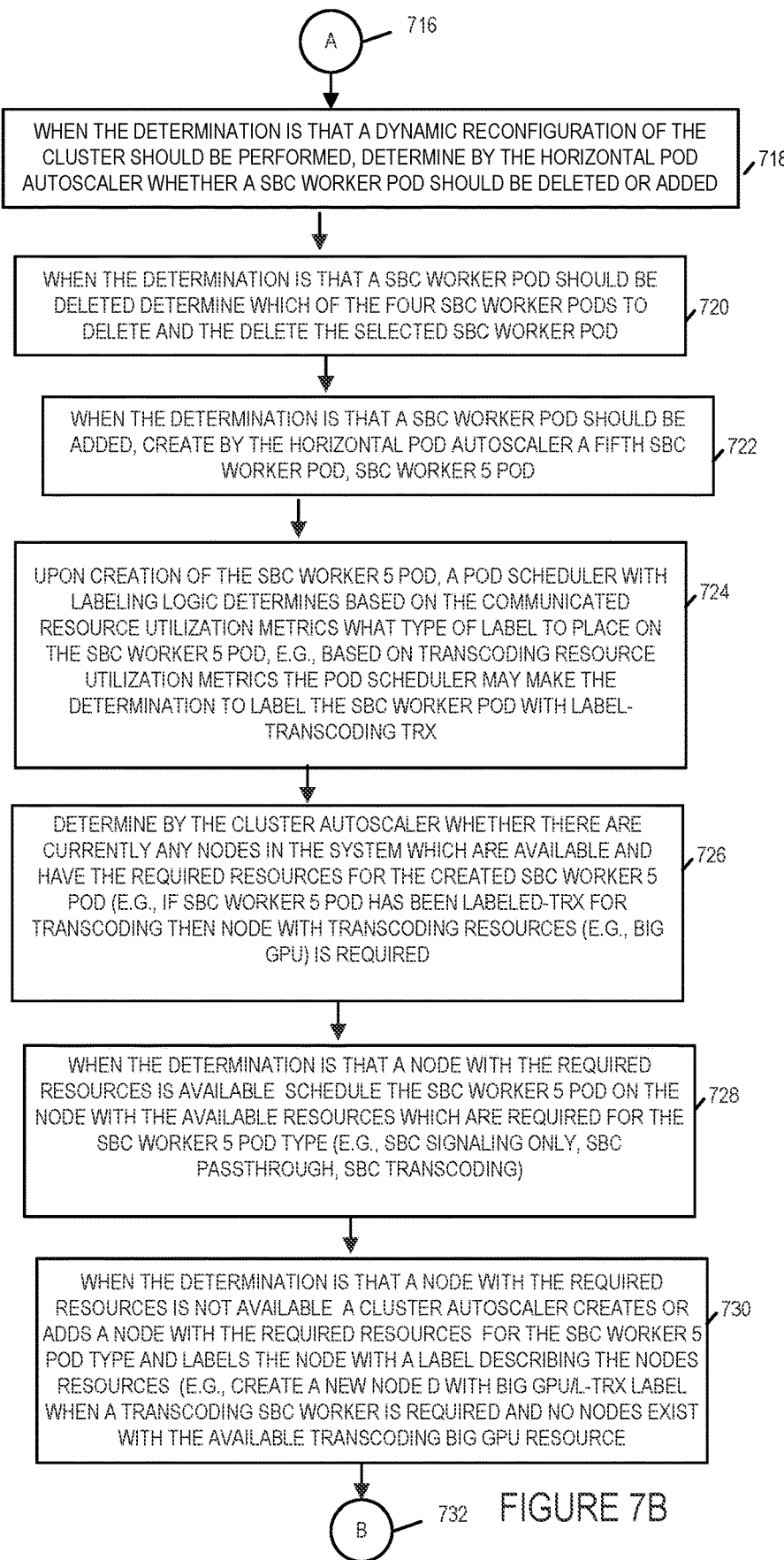

METHODS, APPARATUS AND SYSTEMS FOR CLOUD NATIVE APPLICATION MULTI-FACTOR LOAD BALANCING

RELATED APPLICATION

The present application claims the benefit of Indian Provisional Patent Application Serial Number: 202041041069 which were filed on Sep. 22, 2020 and which is hereby expressly incorporated by reference in its entirety.

FIELD OF INVENTION

The present invention relates to methods, systems and apparatus for load balancing among a cluster of entities. The present invention further relates to methods, apparatus and systems for cloud native application multi-factor load balancing.

BACKGROUND

Load balancing in systems with a front end load balancing entity which distributes loads, e.g., sessions, among a plurality of back end entities are often inefficient and can result in mismatches of back end entities being distributed loads which they are not optimized to handle. This is especially true when the back end entities do not have all the same hardware capabilities and the requirements for back end processing is not known at the time that the front end load balancer makes the selection of which back entity to distribute a load, e.g., a session, to. Furthermore, there are inefficiencies introduced when a mismatch occurs and a load such as a session has to be redirected to another back entity requiring in some cases re-invites and session parameter renegotiations. Furthermore, it would be useful to dynamically change the configuration of the back end entities based on metrics related to the loads being distributed.

Cloud-native applications are applications that are designed or architected to take full advantage of cloud platforms. Various features of cloud-native applications include: the application's utilization of cloud platform services, the ability of the application to scale horizontally, the ability of the application to scale automatically, using proactive and reactive actions, the ability of the application to handle node and transient failures without degrading, and that the application features non-blocking asynchronous communication in a loosely coupled architecture. Cloud-native applications have also been described as a collection of small, independent, and loosely coupled services typically built with services packaged in containers, deployed as microservices in a cloud environment.

Cloud Native Applications for real time sessions usually rely on specialized hardware capabilities for better performance/capacity and to meet the timing requirements of such use cases. Such specialized resources are expensive and it is preferred that they are used only on a per need basis for the special functionality they are intended for rather than for generic processing.

From the foregoing, it is apparent there is a need for new and/or improved methods and apparatus for performing load balancing using multiple factors to avoid inefficiencies in load balancing. From the foregoing, it is also apparent that there is a need for new and/or improved methods and apparatus for efficient redirection of loads such as sessions for which initial distributions to back end entities results in inefficiencies of system resources. From the foregoing, it is also apparent that there is a need for new and improved methods and apparatus for internally redirecting messages to avoid re-negotiating session parameters. From the foregoing, it is also apparent that there is a need for new and/or improved methods and apparatus that allow for the dynamic reconfiguration of back end entities in a systems with a front end load balancer. From the foregoing it is also apparent that there is a need for a technological solution to how to efficiently and effectively provide cloud native application multi-factor load balancing.

SUMMARY

The present invention relates to communications methods and apparatus for performing load balancing. Various embodiments of the present invention address and solve one or more of the technological problems discussed above.

An exemplary method embodiment in accordance with the present invention includes the steps of: receiving from a first device at a Signaling Front End Load Balancer (SLB) a first session initiation request (e.g., SIP Invite request) destined for a second device; making a first session load balancing decision at the SLB with respect to the received first session initiation request; transmitting the first session initiation request to a first Session Border Controller (SBC) worker based on said first load balancing decision, said first SBC worker being one of a plurality of SBC workers forming a cluster of SBC workers, wherein each of said SBC workers is implemented on a node, said first SBC worker being implemented on a first node and a second SBC worker of the cluster of SBC workers being implemented on a second node, said first node and said second node being different nodes; making a session mismatch determination at the first SBC worker with respect to a first session corresponding to the first session initiation request; and when said session mismatch determination is that a session mismatch has occurred notifying the SLB of the session mismatch.

In some embodiments, the communications method further includes the step of: when said session mismatch determination at the first SBC worker with respect to the first session is that no session mismatch has occurred notifying the SLB that a session mismatch has not occurred with respect to the first session initiation request (e.g., by sending an acceptance message for the first session which corresponds to the first session initiation request or a confirmation message that the first SBC worker will handle all the processing required for the first session corresponding to the first session initiation request (e.g., signaling, media anchoring and/or media transcoding processing).

In some embodiments, when said session mismatch determination at the first SBC worker with respect to the first session is that no session mismatch has occurred refraining from notifying the SLB that a session mismatch has occurred with respect to the first session initiation request.

In some embodiments, the SBC workers are implemented on a plurality of different nodes, at least some of said different nodes having different hardware capabilities.

In some embodiments, each of the SBC workers of the cluster of SBC workers has the same functionality.

In some embodiments, the plurality nodes include a first set of nodes and a second set of nodes, said second set of nodes having different capabilities than said first set of nodes. In some embodiments, the first set of nodes includes hardware for performing session signaling protocol processing (e.g., Session Initiation Protocol (SIP) message processing and/or Session Description Protocol (SDP) message processing); and the second set of nodes includes: (i) hardware for performing session signaling protocol processing (e.g., Session Initiation Protocol (SIP) message processing and/or Session Description Protocol (SDP) message processing), and (ii) hardware for performing session media processing (e.g., media relaying of media for a passthrough session or traffic).

In some embodiments, the plurality of nodes further includes a third set of nodes, said third set of nodes having different hardware capabilities than said first set of nodes and having different hardware capabilities than said second set of nodes.

In some embodiments, the first set of nodes includes hardware for performing session signaling protocol processing (e.g., Session Initiation Protocol (SIP) message processing and/or Session Description Protocol (SDP) message processing). The second set of nodes includes: (i) hardware for performing session signaling protocol processing (e.g., Session Initiation Protocol (SIP) message processing and/or Session Description Protocol (SDP) message processing), and (ii) hardware for performing session media processing (e.g., media relaying of media for a passthrough session or traffic). And, the third set of nodes includes: (i) hardware for performing session signaling protocol processing (e.g., Session Initiation Protocol (SIP) message processing and/or Session Description Protocol (SDP) message processing), (ii) hardware for performing session media processing (e.g., media relaying for a passthrough session or traffic); and (iii) hardware for performing media transcoding of media of a session.

In some embodiments, the hardware for performing session signaling protocol processing includes virtual CPUs.

In some embodiments, the hardware for performing session media processing includes one or more interfaces with Single Route I/O virtualization capabilities.

In some embodiments, the hardware for performing media transcoding of media of a session includes one or more GPUs.

In some embodiments, the different hardware capabilities include different hardware resources (e.g., hardware resources optimized and/or available for implementing specific operations, tasks or functions such as a first node with hardware resources optimized and/or available for performing session signaling only, a second node with hardware resources optimized and/or available for performing session signaling and media relay, and a third node with hardware resources optimized and/or available for perform session signaling, media relay and media transcoding).

In some embodiments, the first node has different hardware resources or capabilities than the second node. In some embodiments, the step of making said first load balancing decision at the SLB with respect to the received first session initiation request includes: determining by the SLB to which SBC worker of the cluster of SBC workers to distribute the first session initiation request based on an expected traffic mixture (e.g., percentage of different types of traffic or sessions expected to be received such as: (i) percentage of total expected traffic or sessions requiring only signaling processing, (ii) percentage of total traffic or sessions requiring signaling processing and media processing (e.g., passthrough media traffic or sessions where media of the session requires anchoring) and (iii) percentage of total expected traffic or sessions requiring signaling processing, media processing and media transcoding).

In some embodiments, the step of determining by the SLB to which SBC worker of the cluster of SBC workers to distribute the first session initiation request is further based on hardware capabilities of the node on which each SBC worker is implemented.

In some embodiments, the step of determining by the SLB to which SBC worker of the cluster of SBC workers to distribute the first session initiation request is further based on reported session utilization values received from SBC workers of the cluster of SBC workers.

In some embodiments, the method further includes dynamically reconfiguring the cluster of SBC workers based on resource utilization metrics generated by the SBC workers.

The invention is also directed to systems and apparatus that are used to implement the various method embodiments of the invention. In some apparatus embodiments, the node or device, e.g., SBC, SLB, SIP processing device, packet forwarding module, autoscaler, orchestrator executing the steps and each of the other apparatus/nodes/devices of the system include a processor and a memory, the memory including instructions which when executed by the processor control the apparatus/node/device of the system to operate to perform the steps of various method embodiments of the invention or functions ascribed to the various apparatus/node/device of the system. In some embodiments, the SLB, SBC, SIP processing devices or other entities are virtual devices implemented on compute nodes in a cloud system wherein the compute node includes a processor and memory or is attached to a memory. In various embodiments, the entities of the system are implemented as PODs or native applications on nodes. In various embodiments, the system is a Kubernetes system with the nodes of the system being Kubernetes nodes and the SBC workers being PODs implemented on the nodes.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3 comprises FIG. 3A and FIG. 3B.

FIG. 7 comprises FIGS. 7A, 7B, and 7C.

FIG. 7B is a second part of a flowchart of exemplary method illustrating the dynamic reconfiguration of a system including a cluster of nodes and pods operating on the nodes in accordance with an embodiment of the present invention.

DETAILED DESCRIPTION

Figure 1:
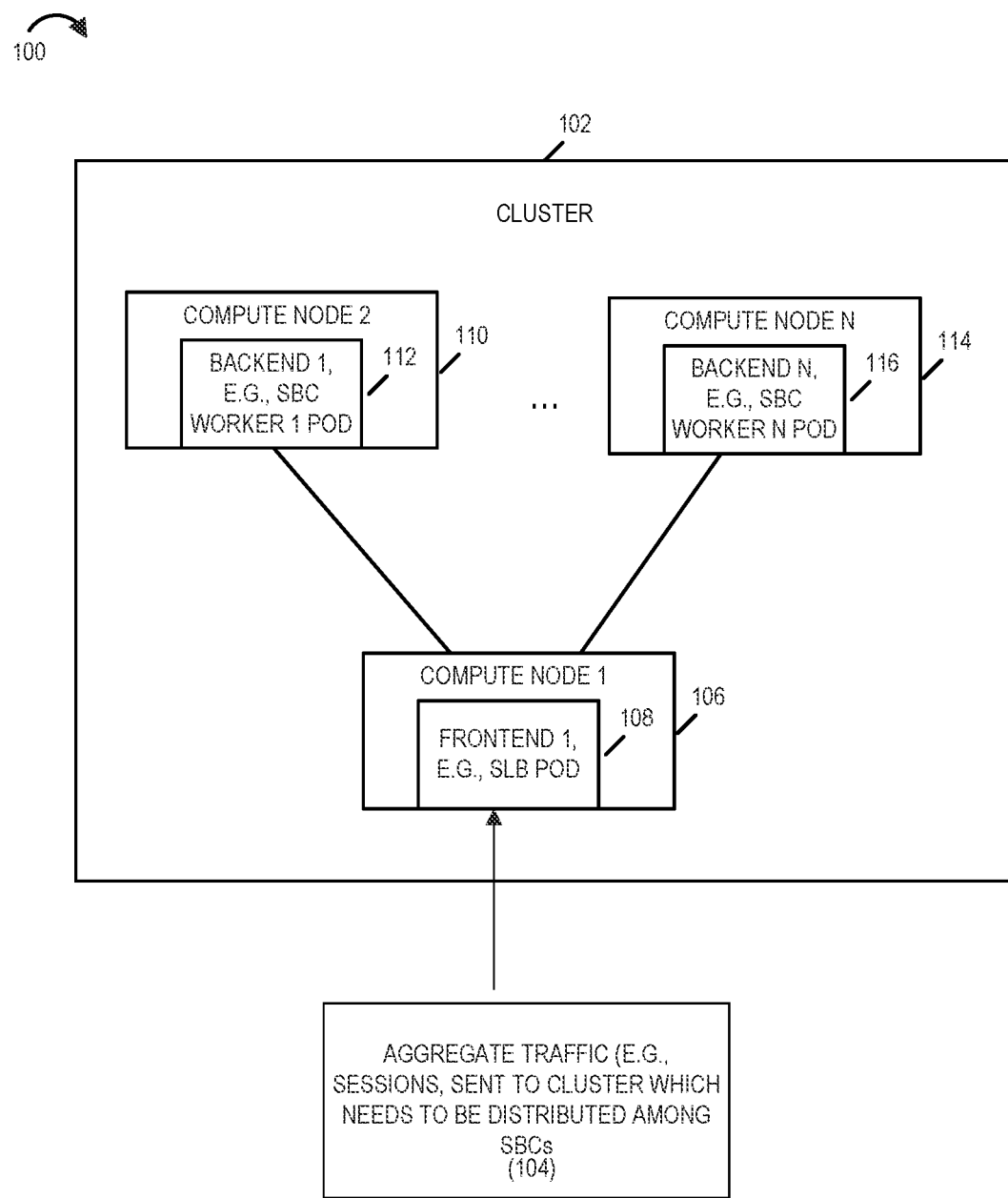
FIG. 1 is a drawing of an exemplary communications system in accordance with an exemplary embodiment.

FIG. 1 illustrates an exemplary communications system 100 in accordance an embodiment of the present invention. Communications system 100 includes a cluster of nodes 102. The cluster of nodes 102 includes a compute node 1 106, compute node 2 110, . . . , compute node N 114, N being an integer greater than 2. Compute node 1 includes a front end 1 load balancer entity 108, e.g., a Signaling Front End Load Balancer (SLB) 108. Compute node 2 110, . . . , Compute node N 114 include respectively backend processing entities, e.g., Session Border Controller (SBC) worker 1 112, . . . , SBC Worker N 116. The front end 1 load balancer may be, and in some embodiments is, implemented as a physical device. In various embodiments, the front end load balancer is implemented as a virtual device or as a network function virtualization. In some embodiments, the front end load balancer is implemented as a native application executing on compute node 1. The back end entities may be, and in some embodiments are, implemented as a physical device. In various embodiments, one or more of the back end processing entities is implemented as a virtual device or as a network function virtualization. Typically all of the back end entities are of the same type for example all network function virtualization components. In many embodiments, the back end entities are implemented as native applications executing on their respective compute nodes.

In various embodiments the cluster is implemented on a Kubernetes system, e.g., located in the cloud, with the compute nodes being Kubernetes nodes and the FrontEnd 1 108 and Backends 112, . . . , 116 being implemented as Kubernetes PODs. For example, in some embodiments, the Frontend 1 108 is a SLB POD and the Backends 1, . . . , Backend N are implemented as SBC worker 1 POD 112, . . . 1, SBC worker N POD.

In some embodiments, each compute node of the system includes a processor and memory or is attached to memory, the memory including instructions which control the operation of the compute node. In some embodiments, the SLB and SBC workers are implemented as virtual machines. In some embodiments, the SBCs and SLB are implemented as devices, e.g., physical devices. In some embodiments, the SLB and/or SBC workers are implemented as native applications executing on the compute nodes. In FIG. 1, aggregate traffic 104 is sent to the cluster and needs to be distributed by the front end load balancer among the back end processing entities. For example, the aggregate traffic can be session (e.g., Session Initiation Protocol sessions) which are received by a front end load balancer (e.g., a signaling load balancer) which distributes the sessions among the back end entities (e.g., the SBC worker 1, . . . , N). In various embodiments, at least some of the compute nodes 1, . . . , N include different hardware capabilities or resources. In various embodiments, the plurality of compute nodes 1, . . . , N include a first set of compute nodes, a second set of compute nodes and a third set of compute nodes with each set of compute needs including one or more compute nodes. In some embodiments, the second set of compute nodes has different hardware capabilities or resources than the first set of compute nodes. In some embodiments, the third set has different hardware capabilities or resources than the first set of compute nodes or the second set of compute nodes.

In various embodiments, the front end load balancing entity is a signaling load balancer, e.g., a Session Initiation Protocol load balancer, which load balances or distributes sessions, e.g., SIP sessions, among the cluster of back end processing entities, e.g., SIP processing entities such as for example SBCs.

Figure 2:
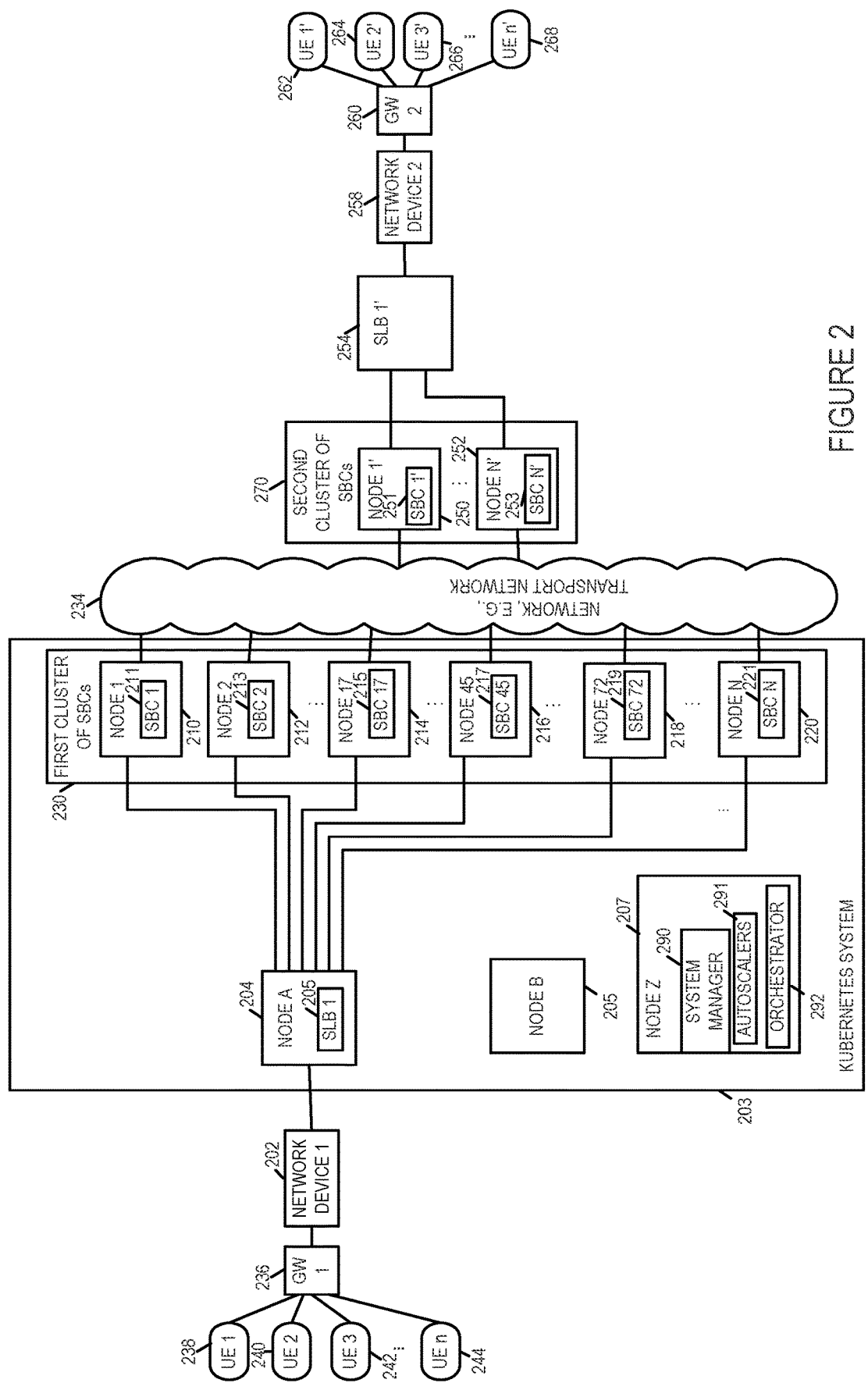
FIG. 2 is a drawing of an exemplary communications system in accordance with an embodiment of the present invention.

FIG. 2 is a drawing of an exemplary communications system 200 including Signaling Load Balancer (SLBs) and Session Border Controllers (SBCs) in accordance with an exemplary embodiment. In an exemplary embodiment, the Signaling Load Balancer is a Session Initiation Protocol (SIP) Load balancer which load balances SIP sessions among a plurality of SBCs forming a cluster of SBCs. The cluster of SBCs appear as a single SBC to entities outside the cluster, e.g., network device 1 202 in the system 200.

Exemplary communications system 200 includes network device 1 202, a system 203, e.g., a Kubernetes system 203, the system 203 including a plurality of nodes (node A 204, node B 201, node Z 207, node 1 210, node 2 212, . . . , node 17 214, . . . , node 45 216, . . . , node 72 218, . . . , node N 220) and a first cluster of SBCs 230 located on some of the plurality of nodes (SBC 1 211, e.g., SBC worker 1 POD, located on node 1 210, SBC 2 213, e.g., SBC worker 2 POD located on a node 212, . . . , SBC 17 215, e.g., SBC worker 17 POD, located on node 214, SBC 45 217, e.g., SBC worker 45 POD, located on node 216, . . . , SBC 72 219, e.g., SBC worker POD, located on node 218, . . . , SBC N 221, e.g., SBC worker N POD, located on node N 220).

In one exemplary embodiment N=100. Each of the SBCs (SBC 1 210, SBC 2 212, . . . , SBC 17 214, . . . , SBC 45 217, . . . , SBC 72 218, . . . SBC N 220) in the first cluster of SBCs maintains resource, e.g., hardware resource utilization metrics. In this exemplary embodiment, the SLB 1 205 is coupled to each of the SBCs (211, 213, . . . , 215, . . . , 217, . . . , 219, . . . , 221) in the first cluster 230 of SBCs. Communications system 200 further includes network 234, e.g., a transport network. The SBCs of the first cluster 230 of SBCs are coupled to network 234.

The exemplary communications system 200 further includes a first gateway 236 coupled to network device 1 202. GW 1 236 is further coupled to a plurality of user equipment (UEs) (UE 1 238, UE 2 240, UE 3 242, . . . , UE n 244). Each of the UEs (238, 240, 242, . . . , 244) may, and sometimes does, initiate a session or call, e.g., for a communications session with another UE. Network device 202 sends session initiation requests, e.g., SIP INVITES to the SLB 205 located on node A for distribution to the SBCs of the first cluster 230. Network device 202 also receives response messages, e.g., a SIP 200 ok message or a service unavailable message, e.g., SIP 503 message, in response to the INVITE. The SLB 205 is in the signaling path for all signaling messages sent to the cluster of SBCs 230.

Exemplary communications system 200 further includes a second network device, network device 2 258 coupled to a second Signaling Load Balancer (SLB 1' 254) coupled to a second cluster 270 of SBCs, said second cluster of SBCs (SBC 1' 251, . . . , SBC N' 253). The second cluster of SBCs (SBC 1' 251, . . . , SBC N' 253) are located respectively on nodes 1' 250, . . . , node N' 252. In this exemplary embodiment, SLB 1' 254 is coupled to each of the SBCs (251, . . . , 253) in the second cluster 270 of SBCs. The SBCs of the second cluster of SBCs 270 are further coupled to network 234, e.g., a transport network.

The exemplary communications system 200 further includes a second gateway 260 coupled to network device 2 258. GW 2 260 is further coupled to a plurality of user equipment (UEs) (UE 1' 262, UE 2' 264, UE 3' 266, . . . , UE n' 268). Each of the UEs (262, 264, 266, . . . , 268) may, and sometimes does, initiate a call, e.g., for a communications session with another UE. Network device 2 258 sends SIP INVITES to the SLB 1 254 for distribution to the SBCs of the second cluster 270. Network device 2 258 also receives response messages, e.g., a SIP 200 ok message, Reinvite or a service unavailable message, e.g., SIP 503 message, in response to the INVITE.

Node Z 207 includes a system manager 290, autoscaler 291 (e.g., horizontal autoscaler and/or cluster autoscaler, and an orchestrator. The Node B 201 is an empty node on which applications, native applications such as SBC workers can be instantiated or implemented and then added to the cluster.

The system manager 290 in some embodiments is an application executing on Node Z 207 which manages the first cluster of SBCs. The autoscalers 291 in some embodiments are applications executing on node Z 207 which add and/or remove nodes from the first cluster of SBCs. In some embodiments, the autoscaler 291 also add PODs or applications to nodes of the cluster 230 or remove or delete PODs or applications from nodes of the cluster 230. In some embodiments, the orchestrator 292 manages the first cluster of SBCs and the SLB 1 including the addition and deletion of nodes and applications, e.g., SBC applications and SLB applications, instantiated and/or implemented on the nodes. In some embodiments, the cluster comprises both the SLB 1 205 and the SBCs 211, 213, . . . , SBC 17, . . . , SBC 45, . . . SBC 72, . . . SBC N 221. In various embodiments the orchestrator 292 in which the system 203 is a Kubernetes system, the orchestrator 291 manages the entire Kubernetes system components.

In some embodiments, an orchestrator device or module, a Virtual Network Function manager device or module, and an element management system device or module are included in the system 203. The orchestrator controls the orchestration and management of network function virtualized infrastructure and software resources and realizing network services on network function virtualized infrastructure. The Virtual Network Function manager device or module operates to control virtual network function lifecycle management including for example instantiation, update, query and termination. A virtual network function as described in the ETSI GS NFV 002 V1.1.1 is a virtualization of a network function. In this example, the virtualized network functions are SLB and SBC workers. The element management system or module performs management functions for one or several of the virtual network functions, e.g., SLB and SBC workers. In various embodiments, each compute node includes one or more processors. In some embodiments, one or more of the compute nodes in the system include a single processor upon which multiple virtual SBCs or SBC worker PODs are instantiated. In some embodiments, each virtual SBC is a set of programming instructions forming a single integrated-SBC application which is executed on a processor of the node.

At least some of the nodes on which the SBCs are implemented have different resources, e.g., hardware resources and capabilities. In some embodiments, a first plurality of the nodes (e.g., Nodes 1 210, . . . , Node 2 213) of the first cluster 230 form a first set of nodes and a second plurality of nodes (e.g., Node 17 214, . . . , Node 45 216). In some such embodiments, the nodes of the second set of nodes have different resources and/or hardware capabilities than the nodes of first set of nodes. In some embodiments, a third plurality of nodes (e.g., Nodes 72 218, . . . , Node N 220) of the first cluster 230 from a third set of nodes. In some such embodiments, the nodes of the third set of nodes includes resources and/or hardware capabilities that are different than the nodes of the first and second set of nodes. In one such embodiment, the nodes of the third set of nodes include a Graphic Processing Unit for transcoding media that is not included in the nodes of the second set of nodes or nodes of the first set of nodes. In the same embodiment, the second set of nodes includes Single Root I/O (Input/Output) Virtualization (SR-IOV) component resource or capability (e.g., a SR I/OV network interface card capability) that is not included in the nodes of the first set of nodes. In some embodiments, each node of the first set of nodes includes one or more vCPUs and typically a plurality of vCPUs. The first set of nodes being optimized for performing session signaling operations. Such nodes are labeled as signaling nodes in some embodiments. The second set of nodes includes one or more vCPUs and typically a plurality of vCPUs and SR-IOV capability/resource. The second set of nodes being optimized for media passthrough (e.g., media anchoring/relay processing). Such nodes are labelled as passthrough or media processing nodes. The third set of nodes including one or more and typically a plurality of vCPUs, SR-IOV capability/resource and a GPU. The third set of nodes being optimized for performing transcoding operations on media, e.g., media packets. Such nodes are labelled as transcoding nodes.

An exemplary embodiment of the present invention includes a Cloud Native SBC architecture which consists of SBC worker backends with integrated signaling/media/transcoding capabilities (I-SBC) and a Signaling Front End Load-balancer (SLB). An integrated SBC (I-SBC) based architecture has certain advantages over a decomposed one with signaling/media/transcoding handled by different Services. The SBC worker and SLB may, and in some embodiments are, implemented on a Kubernetes System. The SBC workers and SLB being implemented as Pods on Kubernetes nodes. Among these advantages of using an integrated SBC are the following. An integrated SBC is less error prone and easier to maintain. It is less vulnerable to infrastructure related failures/issues as all functionality is self-contained within an instance. It eliminates the need for packet transfer among several Services/Nodes for a particular session. This reduces the aggregate packet throughput rate on the Node reducing the likelihood of being limited with respect to this metric. Furthermore, it also eliminates the extra processing cost needed to send/receive packets.

Various embodiments of the present invention provide efficient use of special resources, e.g., hardware resources or capabilities, and furthermore do not require complex state keeping/logic in the front-end load balancing entity (Signaling Front-end Load-Balancer in the exemplary embodiment). The exemplary embodiment of the present invention discussed herein will be for media/transcoding functionality but the same principle can be applied to any functionality requiring specialized resources, e.g., hardware resources or capabilities. Although in various embodiments of the present invention, the SBC worker backends are equal in functionality the Nodes they are placed on are not necessarily so. For example, there could be Nodes without any specialized hardware (HW) capabilities/resources, some Nodes with limited specialized HW capabilities/resources and some Nodes with extensive specialized HW capabilities/resources.

The exemplary embodiment of the present invention is described herein with the special processing capability being transcoding. It is to be understood that the present invention is not limited to the exemplary embodiment of the special processing capability being transcoding but that the present invention is more broadly applicable to cases or situations in which there are resources, e.g., hardware resources, required for special processing. Some additional examples are explicitly discussed below. However, it should also be understood that these are just additional examples and are not meant to limit the scope of the invention.

Various concepts pertaining to the invention will now be discussed.

Expected Traffic Mixture

Expected Taffice Mixtures is the expected or estimated mixture of traffic or session to be handled or processed by the system (SLB and cluster of SBC workers), e.g., the likelihood or probability of a session requiring transcoding or any other type of special processing.

The expected mixture of traffic is provided as a cluster-wide configurable parameter or set of parameters, e.g., 1% of the total percentage of sessions is expected to be sessions requiring signaling only processing, 75% of the total percentage of sessions is expected to be passthrough traffic (e.g., passthrough sessions are sessions that includes a media stream, the media of the media stream requiring media relay processing), 24% of the total percentage of sessions is expected to be transcoding sessions, (e.g., sessions that include a media stream and require transcoding processing of the media of the media stream). In various embodiments, the expected mixture of traffic is first based on estimates and after the system has been operating for a period of time, is based on information and/or derived from the sessions handled by the system (e.g., based on reports from the SBC workers to the SLB on the type of sessions each SBC worker has handled and/or hardware resource utilization reports from the SBC workers to the SLB).

Exclusive Use Factor for Transcoding

Exclusive Use Factor for Transcoding is a parameter indicating the level of exclusivity for transcoding resources.

A value of 100 would mean that SBC workers on Transcoding Capable Nodes need to be used if and only if after transcoding is determined for a session. For example, the SLB in such situations would not distribute initial session requests to SBC workers on Transcoding Capable Nodes but instead would distribute sessions which other SBC workers on allon-Transcoding Capable Nodes determined require transcoding.

A value of 0 would mean that SBC workers on Transcoding Capable Nodes can be used for non-transcoding sessions without any restrictions.

Any value in between 0 and 100 will indicate exclusiveness increasing with its value.

The same concept is applicable for media relay processing as well, i.e., exclusive use of a SBC worker on a Node only for sessions, e.g., calls, requiring media relaying or media anchoring, indicated by the corresponding "Exclusive Use Factor for Media" parameter or sometimes referred to as "Exclusive User Factor for Media Relay processing" or "Exclusive User Factor for Media Anchoring processing".

"Resources" and "Session or Call Types"

Direct Media (DM) (i.e., sessions or calls for which the media is not anchored in the SBC) uses signaling resources.

Passthrough sessions or calls use signaling/media resources.

Transcoded sessions or calls uses signaling/media/transcoding resources.

In this example, it has been assumed that signaling resource usage for all sessions or call types is the same.

In this example, it has also been assumed that all passthrough/transcoded sessions or calls will have similar media resource usage.

"resources" are signaling/media/transcoding (e.g., hardware capabilities and/or hardware resources used for session signaling processing/hardware capabilities and/or hardware resources used for media anchoring or media relaying processing/hardware capabilities and/or hardware resources used for transcoding processing "session or call types" are: (i) Direct Media session or call type, (ii) Passthrough session or call type, (iii) Transcoded session or call type.

Cluster Topology:

In this exemplary embodiment, a cluster will consist of Nodes, e.g., compute nodes including a processor and memory or attached to memory, with resources, e.g., hardware resources or capabilities available that are optimized for different work loads (e.g., for performing different functions, operations and/or processing). In the exemplary embodiment, the resources, e.g., hardware capabilities or hardware resources, on the Nodes will be Resources are best suited for Signaling Only Resources are available for Media relay Resources are available for Transcoding Procedures Various exemplary procedures which are implemented by the SBC workers and SLB in accordance with an embodiment of the present invention will now be discussed.

SBC Procedures

Each SBC Worker will be aware whether it is running on a Transcoding Capable Node or not. For example, the orchestrator which instantiates or implements the SBC Worker on a particular node will inform and/or label the SBC worker based on the Node type on which it has been instantiated or implemented (e.g., an SBC worker instantiated or implemented on a Node with transcoding capabilities is informed or labeled as a Transcoding (Trx) SBC worker.

Each SBC Worker will report its utilization for regular (i.e., non-transcoding) sessions and for transcoded sessions regularly to the SLB. In some embodiments, the utilization reports are sent at predetermined intervals.

Regular session or call utilization reports will include information based on resource usage needed/used for such sessions or calls, e.g., memory usage, Central Processing Unit (CPU) usage, internal queue sizes usage.

Transcoded session utilization reports will include information based on resource usage needed/used for transcoding, for example number of blocks/threads currently used on a Graphics Processing Unit (GPU) of the Node on which the SBC worker is implemented and/or instantiated out of total available on the GPU.

SLB Procedures

Weights for all SBCs (i.e., SBC workers) are determined, generated and/or calculated and new sessions are distributed by the SLB to the SBCs (i.e., SBC workers) according to the determined, generated and/or calculated weights. For example, $SBC$ weight=100–$SBC$ aggregate utilization SLB will keep latest reported aggregate/media/transcoding session utilization values for each SBC Worker SLB will load balance new sessions among the SBCs of the cluster based on the aggregate utilization Procedures for Re-Distributing Sessions Exemplary procedures which may be, and in some embodiments are, utilized for a session or call requiring transcoding after the session or call was initially load balanced by the SLB and distributed to a SBC Worker on a Non-Transcoding Capable Node will now be discussed. These exemplary procedures illustrate how re-direction is handled completely within the cluster of SBC workers. In this case all session processing (for signaling and media relay/anchoring) is performed by the SBC worker the session is re-directed or re-distributed to by the SLB but media packets of the session are relayed through the original SBC worker to which the session was distributed from an IP packet forwarding perspective to the re-directed SBC worker. In this way media ingress/egress addressing can be kept at the original SBC Worker and media packets are communicated or sent by the Original SBC Worker to the new SBC Worker to which the session was re-directed by the SLB. The new SBC worker having the transcoding capabilities to perform the media transcoding operations on the media of the session.

The internal cluster forwarding of media from the originally selected SBC worker to the newly selected SBC worker with transcoding capability does not require a reINVITE (e.g., a Session Initiation Protocol (SIP) reINVITE) to be sent to the peer device as there will not be a change in the media IP Address/port from the peer device's perspective as it will continue to utilize the media IP Address/port of the original SBC worker. In some embodiments which do not use internal cluster forwarding of media a reINVITE request is sent to the peer device so that the peer device has the correct media IP address/port of the newly selected SBC worker. In such cases, no forwarding of media is required. However, it should be noted that utilizing internal cluster forwarding of media from the originally selected SBC worker to the newly selected SBC worker is more efficient and requires less signaling to the peer device and is faster to implement.

When internal cluster forwarding of media from the originally selected SBC worker to the newly selected SBC worker, mapping is implemented if the redirection is needed after a session was established due to a session re-negotiation.

Upon a SBC Worker node operating on a non-transcoding node determining that transcoding is required for a session which has been distributed to it from the SLB, the SBC Worker sends an "internal redirect for transcoding" message or a "session mismatch message" to SLB notifying the SLB that the session has been mismatched and that internal redirection for transcoding purposes is required. This message may, and in some embodiments does, include some or all of the state information associated with the session or only a reference to the corresponding entry in a shared database (DB)/storage device/memory where the state information for the session has been stored by the SBC worker sending the message to the SLB.

Similarly, for cases or situations, where an internal redirection is needed for media anchoring/relaying, an "internal redirection for media anchoring/relaying" message or "session mismatch" message is sent to the SLB notifying the SLB that the session needs to be redirected to another SBC worker in the cluster having media anchoring/relaying optimized resources, e.g., hardware capabilities.

The SLB load balances that is distributes the sessions requiring "Internal re-direction for Transcoding" across SBC Workers of the cluster based on the information contained in the Transcoded Session Utilization reports it receives from the SBC Workers of the cluster, e.g., the SBC Workers implemented on the Nodes with transcoding resources/capabilities.

Similarly, the SLB load balances that is distributes the sessions requiring "Internal Redirection for Media Anchoring/Relaying" across SBC workers of the cluster based on the information contained in the Media Session Utilization reports it received from SBC Workers of the cluster, e.g., the SBC Workers implemented on the Nodes with media anchoring/relaying resources/capabilities.

In embodiments in which internal redirection of sessions is not utilized, the newly selected SBC Worker sends a reINVITE message to the peer device to inform it about the media IP Address/port change. The reINVITE being sent in cases of media re-direction for media transcoding purposes or similarly for media redirection for media anchoring/relaying purposes. Note as explained previously the use of internal cluster re-direction of media is more efficient and does not require the newly selected SBC Worker to send a reINVITE message but does require packet forwarding by the original SBC worker.

The SLB may, and in some embodiments does, keep an internal mapping for re-direction of a session depending on when during the session's progress the redirect is requested.

In various embodiments, a similar process is used to redirect a session to a SBC Worker on a Non-Transcoding Capable Node if a session which eventually does not need transcoding is first load balanced to a SBC Worker on a Transcoding Capable Node.

The procedures described above are also typically utilized for sessions requiring media anchoring/relaying as well depending on the Cluster topology, Node capabilities and the cluster's operating needs/requirements.

Additional SBC Procedures/Features

A discussion of additional SBC procedures/features which are implemented in some but not all embodiments of the invention will now be discussed.

SBC Workers on Transcoding Capable Nodes multiply the generated/determined/calculated Transcoding Utilization value with the "Exclusive Use Factor for Transcoding" for the SBC worker before reporting the value to the SLB.

SBC Workers on Media Anchoring/Relaying Capable Nodes multiply the determined/generated/calculated Media Utilization value with "Exclusive Use Factor for Media" for the SBC worker before reporting the value to SLB.

SBC Workers determine, generate and/or calculate their current utilization of each resource U(s), U(m) and U(t) as a percentage. U(s) being the current resource utilization for session signaling processing. U(m) being the current resource utilization for media anchoring/relaying processing. U(t) being the resource utilization for media transcoding processing.

Each SBC Worker determines, generates, and/or calculates its "normalized aggregate utilization".

Generation of SBC Worker "Normalized Aggregate Utilization

The following may be, and in some embodiments is, used by an SBC Worker when calculating U(a) (aggregate utilization) p being a probability with a value between 0 and 1:

U(s)

U(m)*(p(passthrough)+p(transcoded))

U(t)*p(transcoded)

$U(a)=[U(s)+(U(m)*p(\text{passthrough})+p(\text{transcoded}))+(U(t)*p(\text{transcoded}))]/3$ Factoring in the Impact of Node Capabilities/Resources
No Single Root I/O (Input/Output) Virtualization (SR-IOV). This refers to a Node that does not have SR-IOV capabilities. SR-IOV is a capability that allows a single Peripheral Component Interconnect Express (PCIe) physical device under a single root port to appear as multiple separate physical devices to a hypervisor or a guest operating system on node.
U(m), U(t) is considered always as 100
U(a) is based only on U(s)
SR-IOV but no GPU. This refers to a Node that has SR-IOV capabilities but does not have a Graphics Processing Unit.
U(t) is considered always as 100
U(a) is based on average of U(s) and U(m)
SR-IOV and GPU. This refers to a Node that has both SR-IOV capabilities and a Graphics Processing Unit.
U(a) Based on Average of U(s), U(m) and U(t)
Some nodes of the cluster may be, and in some embodiments, are "signaling only" Nodes
Some nodes of the cluster may be, and in some embodiments are "signaling and passthrough only" Nodes
Some nodes of the cluster perform "signaling, passthrough, and transcoding" that is these Nodes have the resources/capabilities and perform all three types of processing session signaling, media passthrough (media anchoring/relaying) and transcoding.
U(a) Based on Standard Deviation
Standard deviation is determined/generated/calculated, e.g., by the SBC Worker, for all components which were used when calculating U(a).

$U(a)=U(a)/(1-(\text{standard deviation of each component used when calculating } U(a))/100)$ SBC Worker Reports U(a), U(s) U(m), U(t), and Initial Load Balancing Eligibility Value (Yes or No).

In some embodiments SBC Worker only reports U(a), U(m) and U(t) determined values. In some embodiments, the SBC Worker reports the determined U(a), U(s), U(m) and U(t) values by sending a reporting message to the SLB. In some embodiments, the SBC Worker reports the determined U(a), U(s), U(m) and U(t) values by including the information in non-reporting messages (e.g., session mismatch message or internal session redirection request messages (e.g., internal redirection for transcoding message or internal redirection for media anchoring/relaying message, or internal redirection for session signaling message).

SLB Session Load Balancing Procedures

The SLB receives and processes the reported U(a), U(s), U(m) and U(t) values and/or information on an on-going basis. The SLB performs load balancing of sessions (new and/or redirect sessions) among the SBC workers of the cluster based on information in the received utilization reports, e.g., the SBC worker reported utilization values. For example, the SLB load balances or distributes each new session (e.g., each new session initiation request also sometimes referred to herein as a session establishment request, e.g., an SIP INVITE request) to the SBC Workers of the cluster based on the SBC worker reported U(a) values. The SLB load balances redirect (passthrough media anchoring/relay) sessions based on the reported U(m) values. The SLB load balances redirect (transcoding) sessions based on the reported U(t) values.

It is to be understood that a SBC Worker Cluster may, and in some embodiments does, have Nodes which may use a Central Processing Unit (CPU) for transcoding operations as well. Such Nodes in most cases will not consider the CPU as a "transcoding resource" when they calculate relevant utilization metrics but can and, in some embodiments do, use the CPU to transcode calls. This mechanism would help to reduce and even almost eliminate the need for redirections but is usually not preferred as it typically causes inefficient use of recourses. CPUs are inefficient for transcoding operations compared to GPUs.

In various embodiments, the communications system is dynamically re-configured for example by an orchestrator, autoscaler or system manager of the system. SBC Workers are dynamically placed on appropriate Nodes based on information received and/or derived from the reported current utilization metrics. For example, if the cluster is encountering a high rate of transcoded sessions or calls which ca not be accommodated by existing GPU resources, then a new SBC worker would be instantiated and placed on a Node with a GPU. This functionality would be triggered by the metrics reported by SBC Workers to the Orchestrator/Horizontal Autoscaler of the system. Similarly, it could be the case that the Cluster does not have any Nodes with GPU capabilities. In this case an orchestrator, system manager or a Cluster Autoscaler of the system would take action and add a Node with GPU capabilities. This operation would be triggered by the metrics reported by each SBC Worker relating to the resource utilization of resource/hardware capabilities on the Node on which it is implemented. The new SBC Worker would be placed on this new Node with GPU capabilities resulting in an increase in the aggregate GPU/transcoded session or call handling capability of the Cluster.

In various embodiments, the traffic pattern is observed and/or monitored dynamically and new Node types are instantiated or implemented based on the observed and/or monitored traffic pattern. For example, if the observed traffic pattern has more sessions or calls requiring transcoding than previously anticipated/configured then Nodes with a GPU are introduced into the Cluster. Similarly, existing Nodes can be taken out of the Cluster based on changes on traffic pattern, e.g., changes in the expected traffic or session type for the cluster of SBC workers.

Figure 7A:
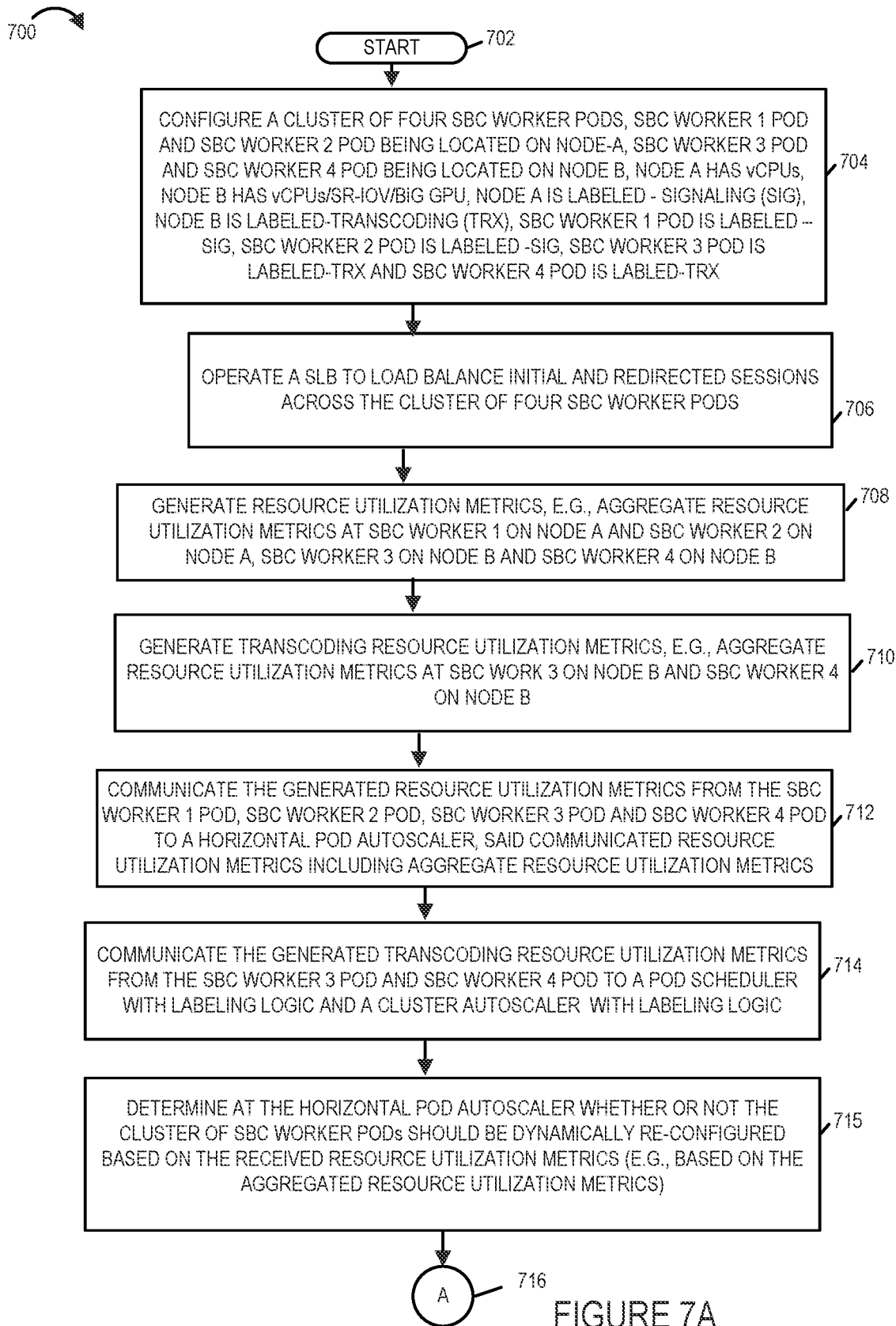
FIG. 7A is a first part of a flowchart of exemplary method illustrating the dynamic reconfiguration of a system including a cluster of nodes and pods operating on the nodes in accordance with an embodiment of the present invention.
Figure 7C:
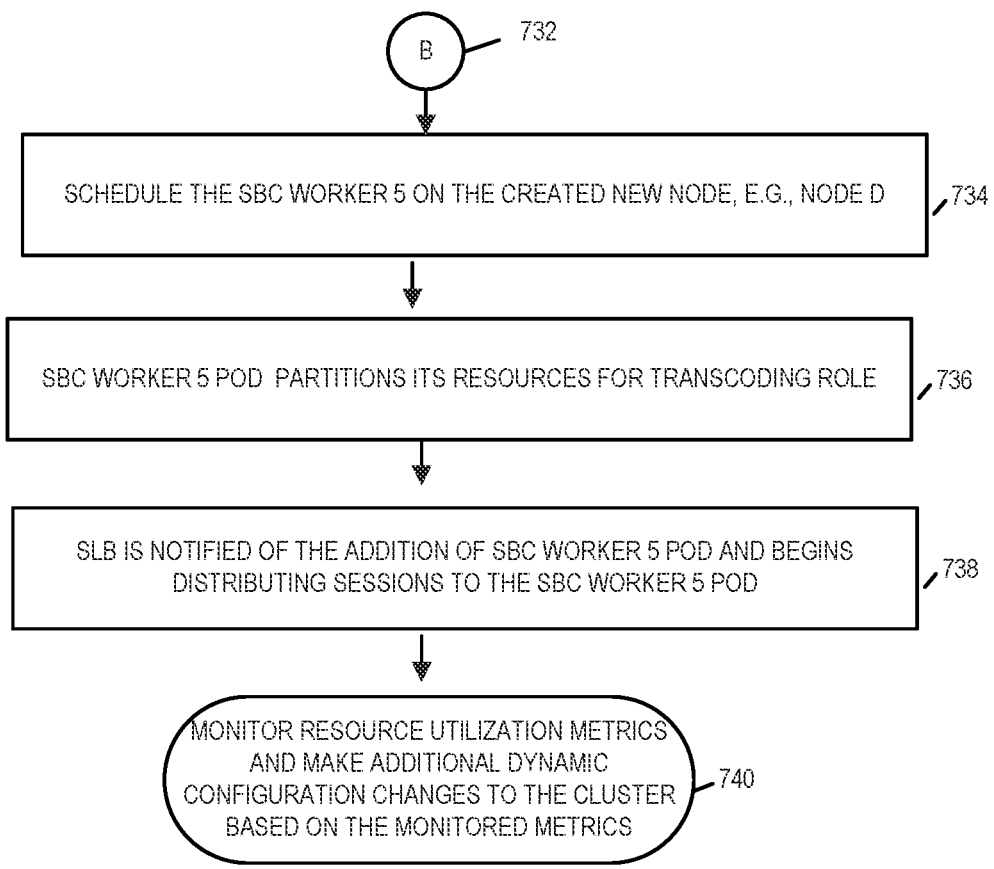
FIG. 7C is a third part of a flowchart of exemplary method illustrating the dynamic reconfiguration of a system including a cluster of nodes and pods operating on the nodes in accordance with an embodiment of the present invention.
Figure 8:
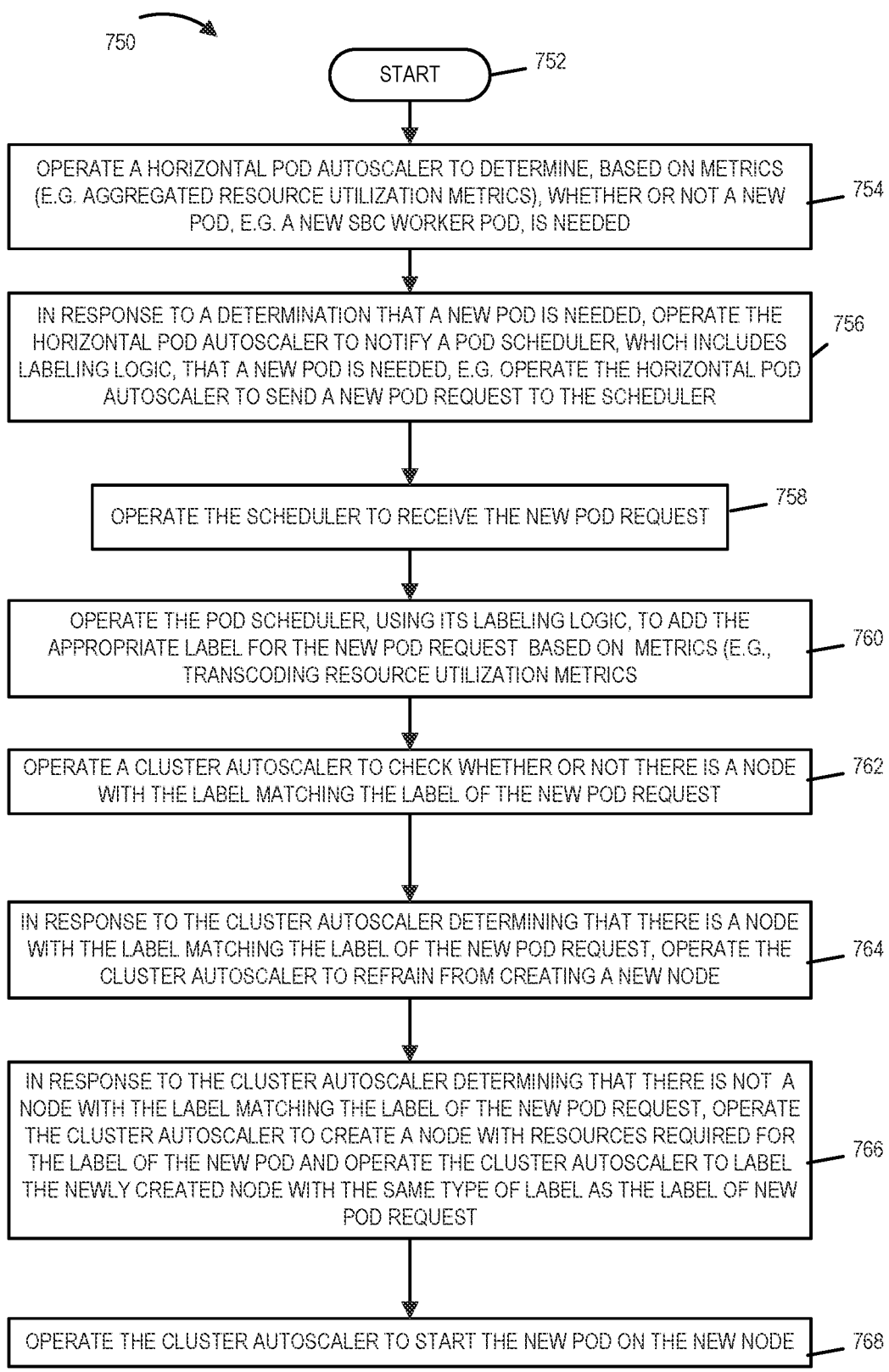
FIG. 8 is a flowchart 750 of an exemplary method making dynamic configuration changes to a cluster based on monitored metrics in accordance with an exemplary embodiment.

FIGS. 6, 7 and 8 discussed in detail below describe exemplary systems and methods for dynamically monitoring and reconfiguring a cluster of SBC and nodes.

As previously discussed redirection may be, and typically is, handled completely within the cluster of SBC Workers. In such cases, all session processing (for signaling and media) would be performed by the SBC worker the session was redirected to but media packets would be relayed though the original SBC Worker from an IP packet forwarding perspective. A Packet Forwarding Module may be, and in some embodiments is, used for forwarding of media packets between SBC Workers on different Nodes. Alternatively, PFM functionality can be provided by an IP Proxy which acts as the front-end for Internet Protocol all packets.

Figure 4A:
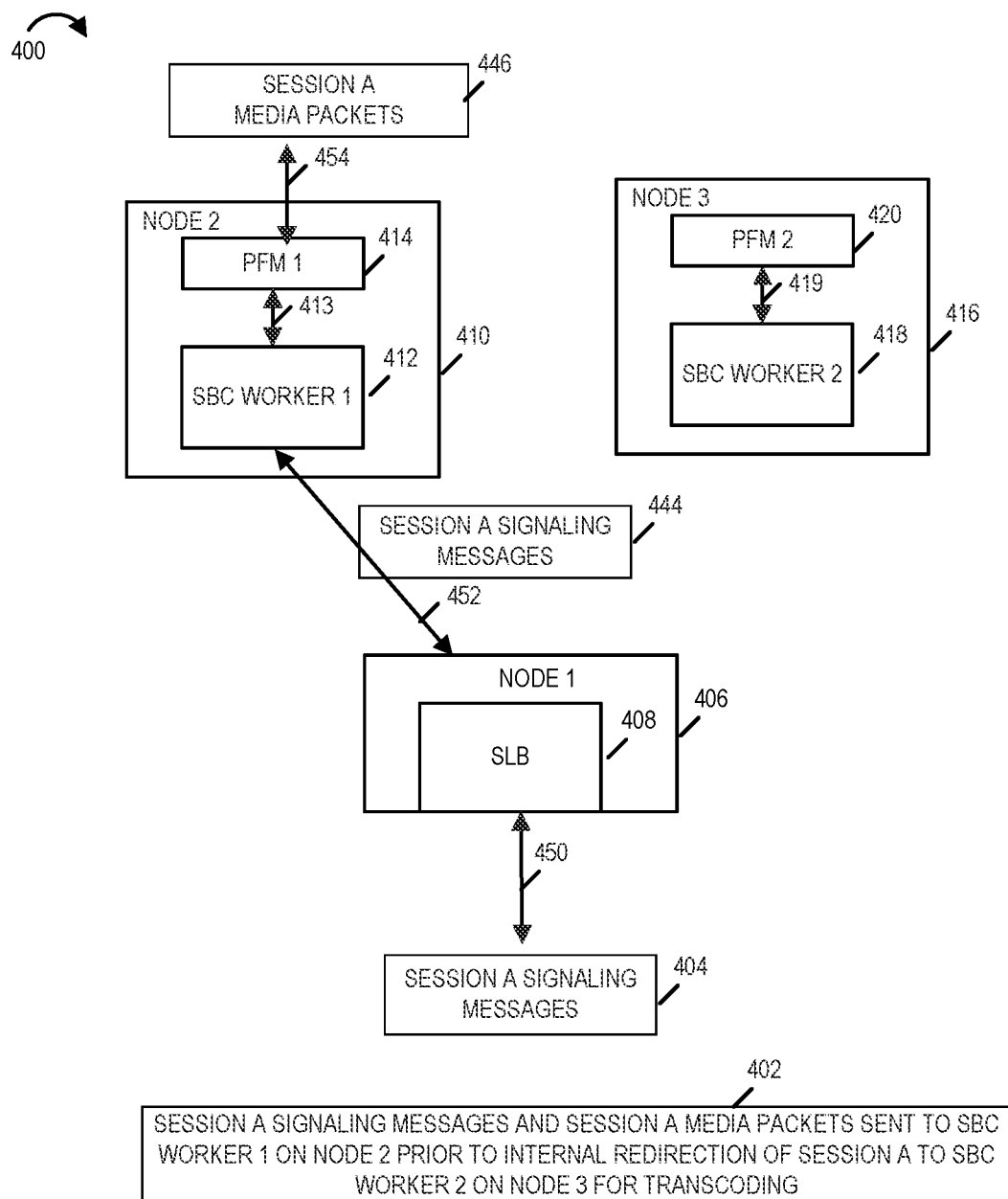
FIG. 4A illustrates a session signaling path and media path before prior to the internal redirection of the session from a first SBC worker to a second SBC worker in accordance with an exemplary embodiment of the invention.
Figure 4B:
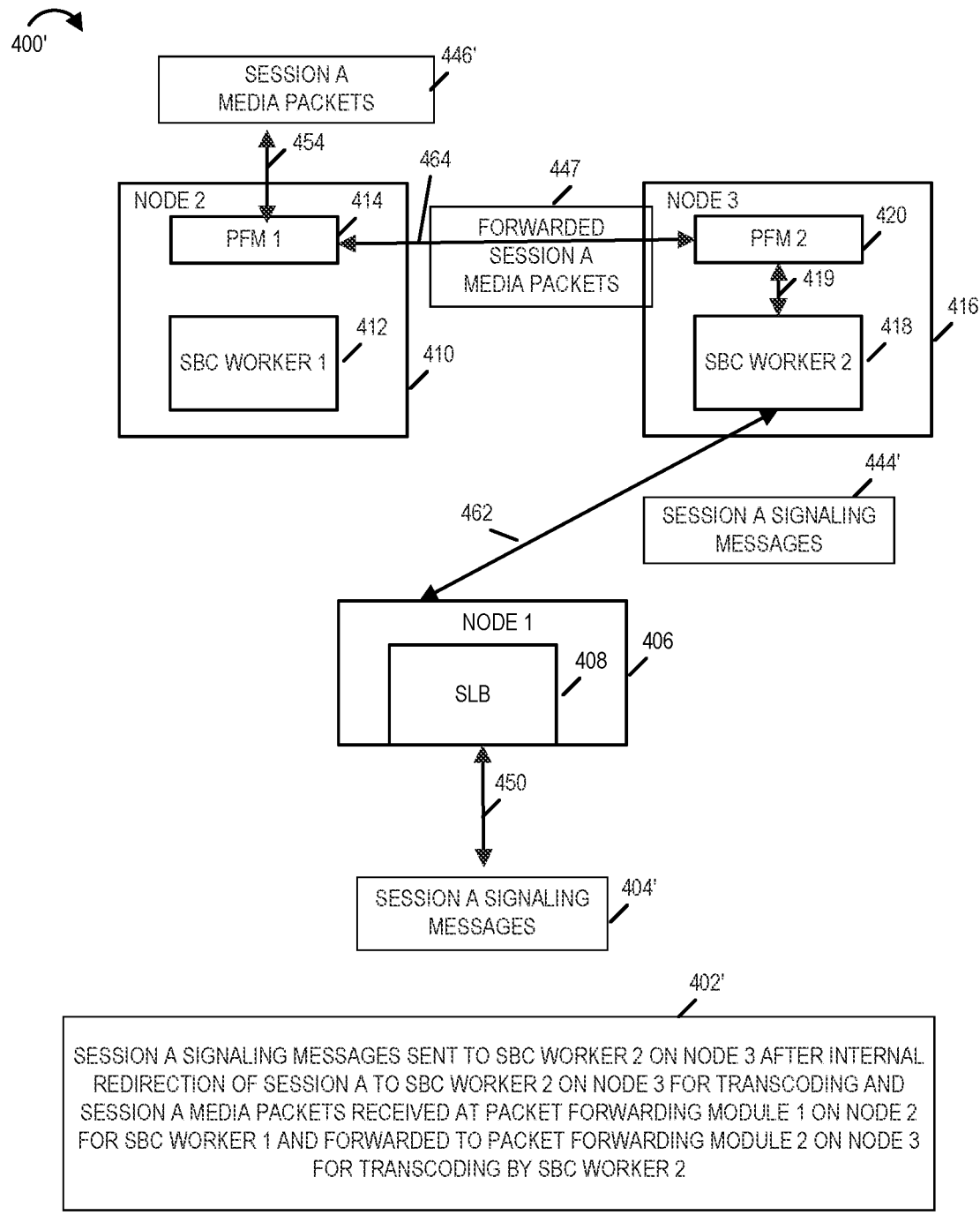
FIG. 4B illustrates the session signaling path and media path after the internal redirection of the session from the first SBC worker to the second SBC worker in accordance with an exemplary embodiment of the invention.

FIG. 4A and FIG. 4B illustrates the session signaling message path before and after redirection of a session A from SBC worker 1 412 executing on node 2 to a SBC worker 2 418 executing on SB3 as well as the forwarding of media packets for the session A by packet forwarding module (PFM) 1 414 to Packet Forwarding Mode 2 420 under the instructions of the SBC worker 1 412.

FIG. 4A illustrates a session signaling path and media path before prior to the internal redirection of the session from a first SBC worker to a second SBC worker in accordance with an exemplary embodiment of the invention. Box 402 merely describes what is depicted in FIG. 4A. As described in box 402 diagram 400 illustrates Session A signaling messages and session A media packets sent to the SBC worker 1 on node 2 prior to internal redirection of session A to SBC worker 2 on node 3, the redirection being for transcoding of media of the session. Session A media packets 446 are sent over communications link 454 to node 2 410 and received at packet forwarding mode (PFM) 1 414. From PFM 1 the session A media packets are communicated over link 413 to SBC worker 1 412. SBC Worker 1 being the selected SBC Worker for handling Session A. Session A signaling messages 404 are received by the SLB 408 on node 1 406 and are communicated via communications link 450 to SBC worker 1 412 on node 410. The session A signaling messages 444 are the same as or based on session A signaling messages 404.

FIG. 4B illustrates a session signaling path and media path after the internal redirection of the session from the SBC worker 1 412 to the SBC worker 418 in accordance with an exemplary embodiment of the invention. Box 402' merely describes what is depicted in FIG. 4B. As described in box 402' diagram 400' illustrates Session A signaling messages 404' are sent directly to SBC worker 2 418 on node 3 416 after internal redirection of session A from SBC worker 1 on node 2 to SBC worker 2 on node 3 for transcoding. Session A media packets 446' are received at packet forwarding module 1 414 via communications link 454 on node 2 410 for SBC worker 1. The media packets are forwarded to packet forwarding module 2 420 on node 3 416 via communications link 464. From packet forwarding module 2 420 the forward media packets are communicated to SBC Worker 2 418 via communications link 419 for transcoding by SBC worker 2 418. The media packets 446' and forward media packets 447 are the same that is the media has not been modified just forwarded.

Session A signaling messages 404' are received by the SLB 408 on node 1 406 and are communicated via communications link 450 to SBC worker 2 418 on node 416. The session A signaling messages 444' are the same as or based on session A signaling messages 404'.

By using internal forwarding the peer devices with which session A has been established can continue to utilize the SBC worker 1 media IP address/port for media of the session A. This eliminates the need to send a SIP ReInvite message to update the media IP address and port from SBC worker 1 to SBC worker 2. It should be understood that all nodes have the capability to forward media packets even if they are signaling only nodes. Hence, internal redirection may be, and typically is, used when redirection from one SBC to another is required in the cluster of SBCs.

In some embodiments, an SBC worker makes a determination about the nature of the session or call, e.g., whether it will require transcoding or not, based on one or more of the following: (i) where the session establishment request, e.g., SIP INVITE, is received from (e.g., source address), (ii) the content of the SIP INVITE message (e.g., SDP offer message information included in the SIP INVITE), and (iii) where the session establishment request is to be sent (i.e., destination address). It may, and sometimes does, then decide to redirect the call based on the result of this operation before sending the egress session establishment request, e.g., SIP INVITE, to the destination. In such a case it sends the session mismatch message or "internal redirect" message notifying the SLB to internally redirect the session or call.

Figure 5:
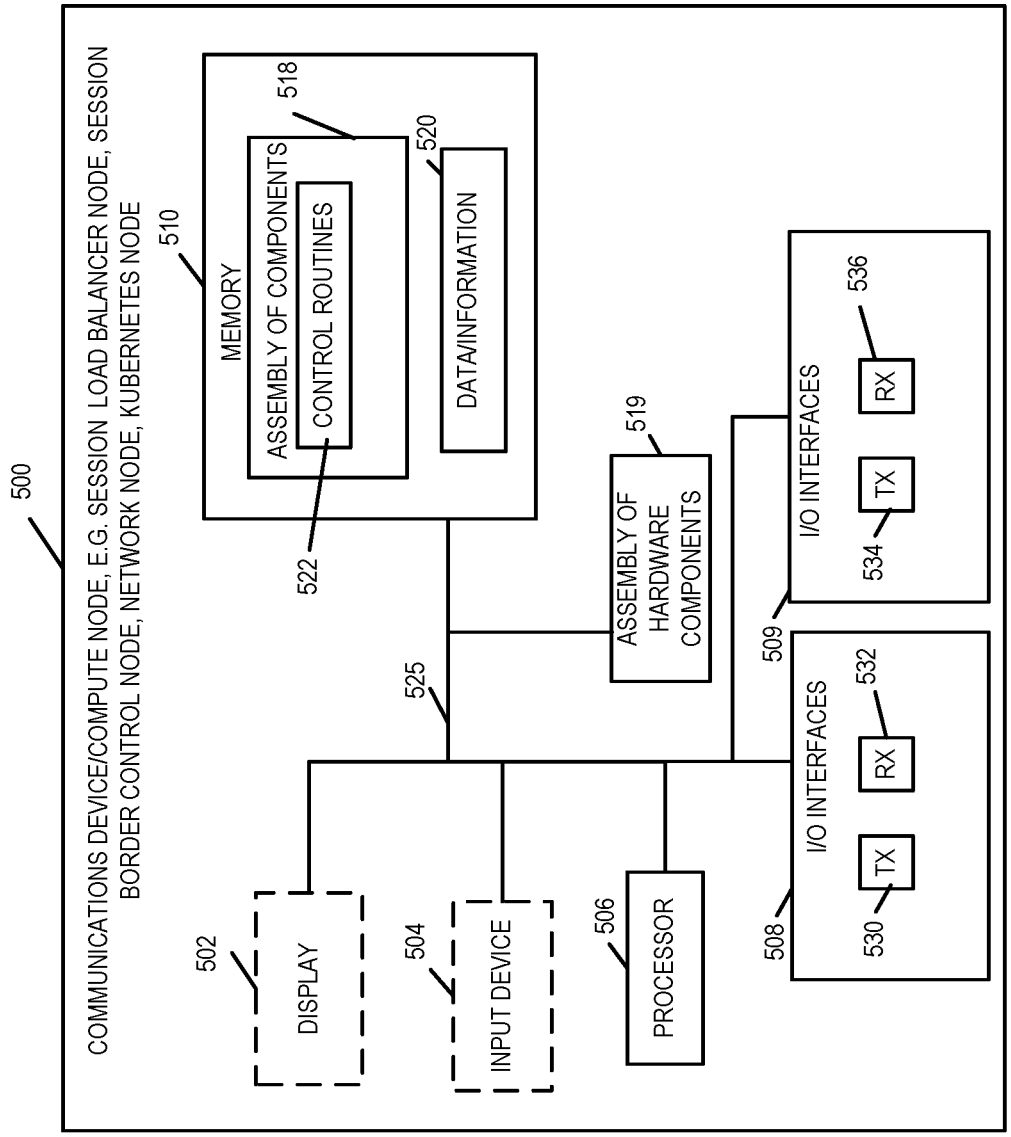
FIG. 5 is an exemplary communications/computing device/node in accordance with an embodiment of the present invention.

In some embodiments, one or more of the elements, nodes or components of the above mentioned systems are implemented in accordance with the exemplary computing device/node 500 illustrated in FIG. 5.

Exemplary communications device and/or compute device/node 500 includes an optional display 502, an optional input device 504, a processor 506, e.g., a CPU, I/O interfaces 508 and 509, which couple the communications device/node 500 to networks or communications links and/or various other nodes/devices, memory 510, and an assembly of hardware components 519, e.g., circuits corresponding to different components and/or modules, coupled together via a bus 525 over which the various elements may interchange data and information. Memory 510 includes an assembly of components 518, e.g., an assembly of software components, and data/information 520. The assembly of software components 518 includes a control routines component 522 which includes software instructions which when processed and executed by processor 506 control the operation of the communications/computing device/node 500 to perform various functions and/or one or more steps of the various method embodiments of the invention. The I/O interface 508 includes transmitters 530 and receivers 532. The I/O interface 509 includes transmitters 534 and receivers 536. The I/O interfaces are hardware interfaces including hardware circuitry. The communications device/node and/or compute device/node 500 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Session Initaiton Protocol, Session Description Protocol, Internet Protocol (IP), Transport Control Protocol (TCP), User Datagram Protocol (UDP), WebRTC protocols, Representative State Transfer (REST) protocol, SQL (Structured Query Language) Protocol, and HDFS (Hadoop Distributed File System) Protocol, SQL and/or HDFS being used to interface and access information from the various databases and/or storage devices to which it may be coupled. In some embodiments, the communications and/or computing device/node 500 includes a communication component configured to operate using Session Initiation Protocol, Session Description Protcol, IP, TCP, UDP, REST, SQL (Structured Query Language), or HDFS (Hadoop Distributed File System). In some embodiments, the communications component is a hardware component, a software component or a component including hardware and software components. While only a single hardware processor is illustrated in some embodiments, it is to be understood that the computing device/node 500 can include more than one processor with the processing being distributed among the plurality of processors. In various embodiments, the assembly of hardware components are specialized hardware components or resources which provide the compute device/node on which the assembly of components resides with specialized hardware capabilities and/or functionalities. In some embodiments, the one or more GPUs are includes as a hardware component, e.g., on transcoding nodes (nodes that have specialized hardware for transcoding media of a session). In some embodiments, the assembly of hardware components includes a SR-IOV component, e.g., on pass-through nodes (nodes that have specialized resources for implementing media anchoring/media relaying operations). Various nodes have virtual CPU functionality.

In some embodiments, an orchestrator device or module, a Virtual Network Function manager device or module, and an element management system device or module. The orchestrator controls the orchestration and management of network function virtualized infrastructure and software resources and realizing network services on network function virtualized infrastructure. The Virtual Network Function manager device or module operates to control virtual network function lifecycle management including for example instantiation, update, query and termination. A virtual network function as described in the ETSI GS NFV 002 V1.1.1 is a virtualization of a network function. In this example, the virtualized network functions are signaling-SBCs, a U-SBC, packet plane control service application. The element management system or module performs management functions for one or several of the virtual network functions, e.g., virtual signaling termination application and media interworking application. Each compute node includes one or more processors. In some embodiments, one or more of the compute nodes in the system include a single processor upon which multiple virtual signaling-SBCs, U-SBCs and/or packet plane control service applications are instantiated. In some embodiments, each virtual signaling termination application and media interworking application is a set of programming instructions forming a signaling-SBC application, U-SBC application or a packet plane control service application which is executed on a processor of a compute node.

Figure 3A:
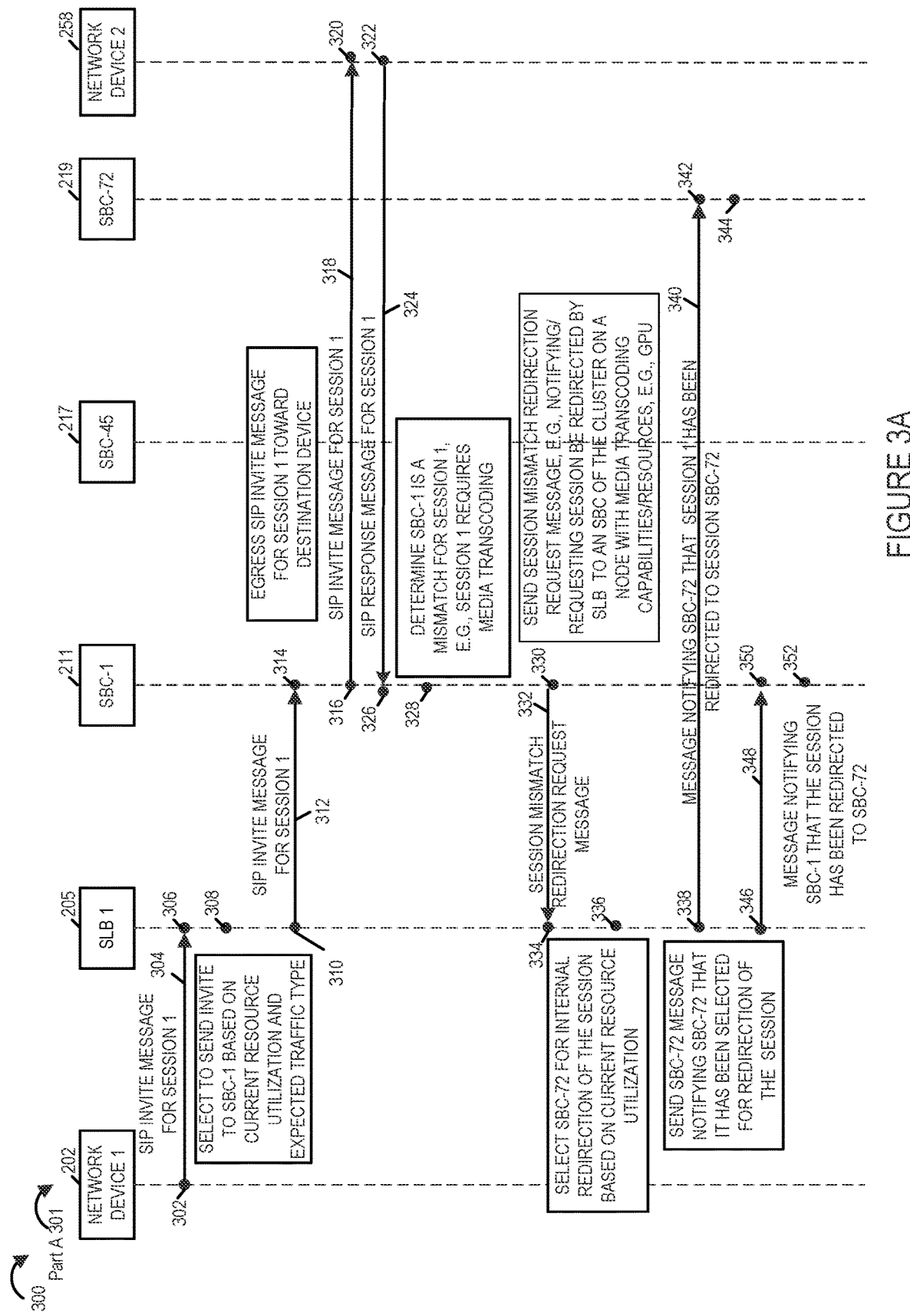
FIG. 3A is the first part of a signaling diagram which illustrates the steps and signaling of an exemplary method in accordance with an embodiment of the present invention.
Figure 3B:
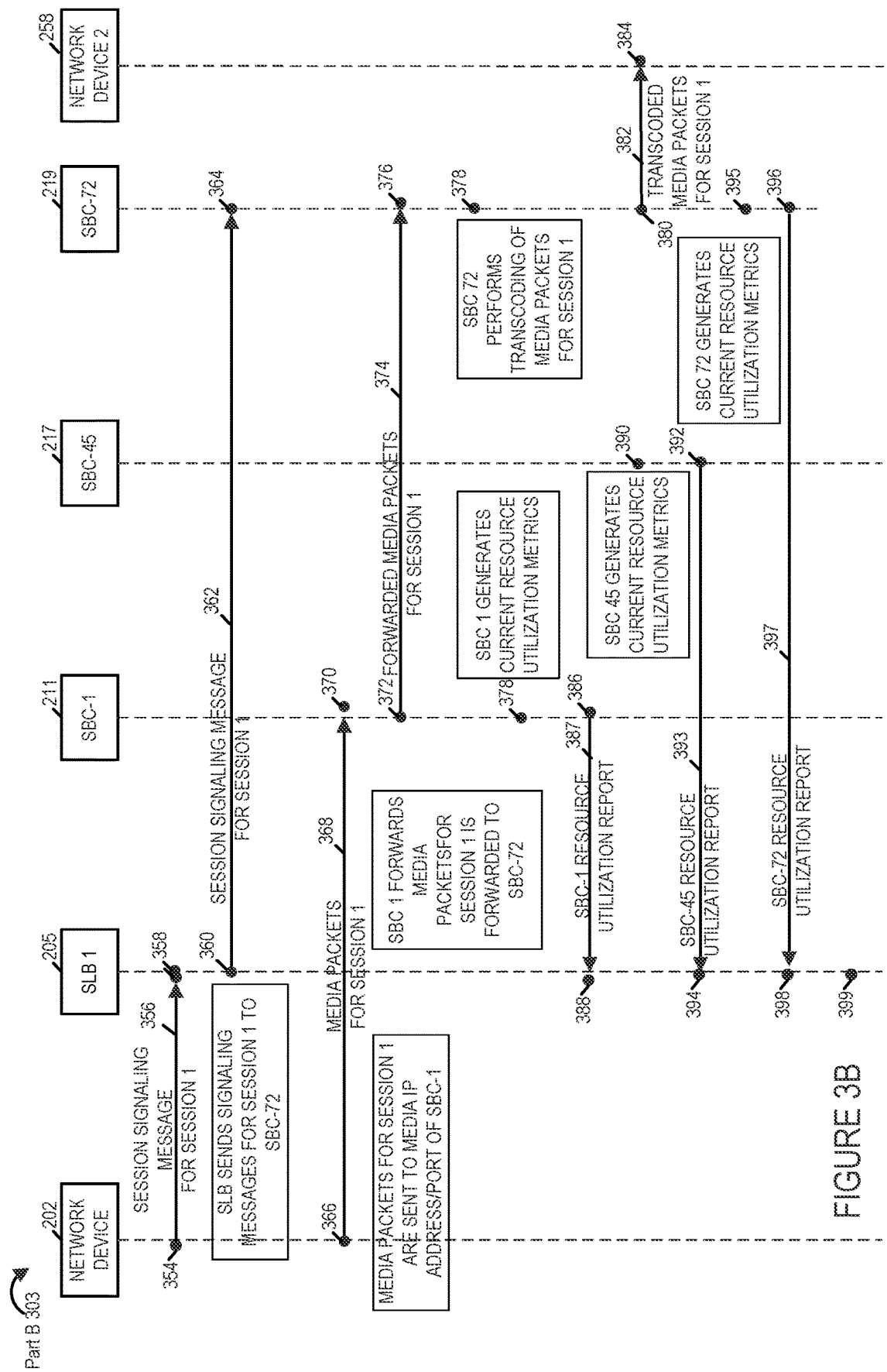
FIG. 3B is the second part of a signaling diagram which illustrates the steps and signaling of an exemplary method in accordance with an embodiment of the present invention.

FIG. 3 comprises FIG. 3A and FIG. 3B. FIG. 3A is the first part of a signaling diagram which illustrates the steps and signaling of an exemplary method in accordance with an embodiment of the present invention. FIG. 3B is the second part of a signaling diagram which illustrates the steps and signaling of an exemplary method in accordance with an embodiment of the present invention.

For explanatory purposes the exemplary method 300 will be explained in connection with the exemplary communications system 200 illustrated in FIG. 2. However, it should be understood that the method may be implemented using other systems as well as other system configurations then those illustrated in FIG. 2. While it will be readily understood that additional steps and signaling are performed in connection with communicating information, messages, and packets between devices, the method 3000 focuses on and discusses the steps and signaling for understanding the invention. Time progress downward on the signaling diagram. Part A 301 shown on FIG. 3A of the signaling diagram shows a first set of steps and signaling followed in time sequence by the steps and signaling shown on Part B 303 of FIG. 3B.

Elements with the same numbers in different figures are the same and will be described in detail. In FIG. 3, the signaling and operations between network device 1 202, SBL 1 205, SBC-17 215, SBC-45 217, SBC-72 219 and network device 2 258 are shown and described these are the elements from system 200. In this example, system 203 is a Kubenetes system, the nodes on which the SLB and SBCs are located Kubernetes nodes. SBC-1 211 is a SBC worker 1 POD implemented on node 1 210 which has a vCPU and is signaling only node. the SBC-1 is a signaling only SBC. The SBC 45 217 is a SBC worker 45 POD implemented on node 45. Node 45 having a vCPU and a SR-IOV capability. Node 45 is a passthrough/media anchoring/media relaying node and SBC 45 is a passthrough/media anchoring/media relaying SBC. SBC 72 219 is implemented on Node 218. Node 218 includes a vCPU, SR-IOV capability/resources and a GPU. Node 218 is a transcoding node that includes specialized hardware (e.g., GPU) for transcoding media. The SBC 72 219 is a transcoding SBC. The node 1 does not include a SR-IOV or a GPU. The node 45 does not include a GPU.

The method 300 shown in FIG. 3 will now be discussed in detail. The method starts in start step 302 shown on FIG. 3A part A 301 of the signaling diagram.

Operation commences in step 302 shown on FIG. 3A. In step 302, a SIP INVITE message 304 for a session 1 is generated by the network devcie 1 202 and transmitted to the SLB 1 205. The SIP INVITE message 304 may originated from one of the UEs coupled to the network device 1 for example UE 1 238 which is initiating a session with one of the UEs for example UE 2' 264 coupled or connected to network device 2 258.

In step 305, SLB 1 205 receives and processes the SIP INVITE message 304. In step 308, the SLB 1 performs a load balancing determination and selects SBC 1 211 to handle the processing for session 1. The selection of SBC 1 211 is based on current resource utilization information received from the SBCs of the cluster of SBCs 230 and/or the expected traffic type. The expected traffic type being in this example the probability that the session the SIP INVITE message is to establish is a signaling only session. Operation proceeds from step 308 to step 310. In step 310, the SIP INVITE message for session 312 is generated by the SLB 1 based on the SIP INVITE message 304 and is transmitted to the selected SBC of the first cluster of SBCs 230. In this example, the selected SBC is SBC 1 211. Operation proceeds from step 310 to step 314.

In step 314, SBC 1 211 receives and processes the SIP INVITE message 312. Operation proceeds from step 314 to step 316.

In step 316, the SBC 1 generates SIP INVITE message 318 based on SIP Invite message 312 and egresses SIP INVITE message for session 1 318 toward its destination device by transmitting the SIP INVITE message 3187 to network device 2 258 (e.g., via network 234, second cluster of SBC 270, SLB 1' 254) to network device 2 258. Operation proceeds from step 318 to step 320.

In step 320, the network device 2 258 receives the SIP Invite message for session 1 318 and processes. In this example, the network device 2 258 will forward it via gateway 2 260 to the destination device, e.g., UE 2' 264. The destination device, e.g., UE 2' 26, will send a SIP Response message for session 1 to the network device 2 258.

Operation proceeds from step 320 to step 322. In step 322, the network devices generates SIP response message for session 1 324 in response to the SIP Invite message 318 and transmitted the SIP response message 324 to SBC 1. The SIP response message is generated on information received from a destination device of the SIP Invite message.

Operation proceeds from step 322 to step 326. In step 326, the SBC 1 211 receives and processes the SIP response message 324. The SBC-1 sends a response message back to originating end-point device, e.g., UE 1, 238 via the SLB 1 205, network device 1 202, and gatewayl 236. In this example, the session is established.

Operation proceeds from step 326 to step 328. In step 328, the SBC 1 211 determines that there is a mismatch for session 1, e.g., session 1 requires media transcoding and SBC 1 211 is executing on node 210 which is not a transcoding node that is it is not optimized for transcoding media. Node 1 210 does not have resource or hardware capabilities optimized for transcoding media such as a GPU. The SBC 1 211 is aware that it is a signaling SBC as it was labelled a signaling SBC when instantiated, e.g., by the orchestrator or horizontal autoscaler of system 200. In various embodiments, the SBC 1 211 makes the determination that it is a mismatch for the session based on information included in the SIP signaling messages it processes for the session, e.g., the SIP INVITE request message and SIP response message.

The SIP Invite messages and/or SIP response messages shown in FIGS. 3A and 3B include information for establishing session 1. In some embodiments, the SIP Invite message includes a SDP Offer message and the SIP response message includes a SDP answer message. The SDP offer and SDP answer messages including information on whether the session is to be include a media and types of encoding/decoding supported. From the information included in the SIP signaling messages the SBCs of the cluster can determine whether they are a mismatch for the session, e.g., because they are not a transcoding SBC (e.g., the SBC 1 is not executing on a node that has a GPU and is specialized for performing transcoding functions). In some embodiments, the SBC 1 may determine the mismatch after response the SIP response message to the SIP Invite message or it may occur at a later time in the session.

Operation proceeds from step 328 to step 332. In step 332, the SBC 1 generates session mismatch redirection request message 332 and transmits the message 332 to the SLB 1 205. The session mismatch redirection request message 332 includes information notifying and/or requesting that session 1 be redirected by the SLB 1 205 to an SBC of the cluster executing on a node with media trancoding capabilities/resources, e.g., GPU. The session mismatch redirection request message 332 also includes session state information for session 1 and/or the location in a shared databased or memory (e.g., shared by the SBCs of the first cluster of SBCs 230) in which the session state information for session 1 is located. Operation proceeds from step 330 to step 334.

In step 334, the SLB 1 205 receives and processes the session mismatch redirection request message 332 from SBC 1 211. Operation proceeds from step 334 to step 336.

In step 336, SLB 1 205, in response to receiving the session mismatch redirection request message 332, performs another session load balancing operation and determines and/or selects SBC-72 219 for internal redirection of the session (i.e., SBC 72 is selected to handle the session signaling and media procession for session 1). The selection and/or determination is made from the available SBCs of the first cluster of SBC 230 that are transcoding SBCs. Transcoding SBCs being SBCs that are executing on nodes with transcoding hardware (e.g., a big GPU). The selection or determination is made based on the current resource utilization information/reports received from the SBCs of the first cluster of SBCs. Operation proceeds from step 336 to step 338.

In step 338, SLB 1 205 generates message 340 notifying SBC-72 219 that session 1 has been internally redirected to session SBC 72 219 and transmits the message 340 to SBC 72 219. The message 340 includes the session state information for session 1 received from SBC 1 211 in session mismatch redirection request message 332 or the location in the shared database or memory in which the session state information for session 1 was stored by SBC 1 211. In various embodiments, the session state information for session 1 being information necessary for SBC 72 219 to take over processing responsibilities for the session. This typically occurs without the need for re-establishing or re-negotiating the session by the SBC to which the session was redirected. Operation proceeds from step 338 to step 342.

In step 342, the SBC 72 receives and processes the message 340. The SBC 72 acknowledges that it has accepted responsibility for session 1. Operation proceeds from step 342 to steps 346 and 344.

In step 344, the SBC 72 obtains the session state information for session 1 and takes over responsibility for session 1 from SBC 1 211.

In step 346, the SLB 1 205 generates and transmits message 348 to the SBC-1 211 notifying SBC 1 211 that the session has been redirected, e.g., internally redirected to SBC 72. Operation proceeds from step 346 to step 350.

In step 350, the SBC 1 211 receives and processes message 348 which includes information notifying SBC 1 211 that session 1 has been redirected, e.g., internally redirected, to SBC 72 219. Operation proceeds from step 350 to step 352.

In step 352, the SBC 1 211 prepares to redirect any media packets received for session 1 to SBC 72 219 as part of the internal redirection process for the session. Using internal redirection allows the external peer devices, e.g., network device 1 202 and network device 2 258 to continue to utilize the IP address/port of SBC 1 previously established for session 1 thus no SIP re-Invite messages are required. As explained above, this is advantageous as it is fastest and more efficient as it does not require extra signaling with the peer devices. Operation proceeds to step 354.

In step 354 shown on FIG. 3B, a SIP session signaling message for session 1 356 is generated and transmitted from network device 202 to the SLB 1 205. Operation proceeds from step 354 to step 358.

In step 358, the SLB 1 205 receives and processes the SIP signaling message 356. The SLB 1 205 determines that the SIP signaling message 356 is for session 1. Operation proceeds from step 358 to step 360.

In step 360, the SLB 1 205 generates SIP signaling message 362 for session 1 based on SIP signaling message 356 and transmits it to the SBC 72 219. The message 362 includes the information received in SIP message 356. Operation proceeds from step 360 to step 364.

In step 364, SBC72 219 receives the SIP signaling message 362 and processes it.

In step 366, network device 202 transmits media packets 368 for session 1 to media IP address/port of SBC 1 which was provided to the network device 202 during establishment of the session prior to the re-direction. Operation proceeds from step 366 to step 370.

In step 370, the SBC 1 211 receives the media packets 368 at SBC 1 media IP address/port established for session 1. Operation proceeds from step 370 to step 372. In step 372, SBC 1 211 determines that the media packet 368 are for session 1, e.g., based on the media IP address/port on which the media packets, and forwards or transmits the media packets 374 for session 1 to SBC 72 219. Operation proceeds from step 372 to step 376.

In step 376, the SBC 72 219 receives the forwarded media packets 374 for session 1 from SBC 1 211. Operation proceeds from step 376 to step 378.

In step 378, SBC 72 219 performs transcoding operation on the received forwarded media packets for session 1 using for example it specialized transcoding hardware, e.g., GPU. Operation proceeds from step 378 to step 380.

In step 380, SBC 72 219, transmits the transcoded media packets 382 for session 1 to network device 2. Operation proceeds from step 380 to step 384.

In step 384, the network device 2 258 receives the transcoded media packets 382 for session 1. The network device 2 258 transmits the transcoded media packets toward there end destination for example to UE 2' 264.

It should be understood from the signaling diagram/method 300 that after the internal redirection of session 1 from SBC 1 211 to SBC 72 219 that all SIP signaling messages are sent by the SLB 1 205 directly to the SBC 72 however all media packets for session 1 are sent to SBC 1 211 media IP address/port setup for session 1 and SBC 1 internally in the first cluster of SBCs forwards them to SBC 72 which has taken over the session from SBC 1. In some embodiments, SBC 1 and SBC 72 during the redirection takeover process negotiate which media IP address/port associated with SBC 72 to which SBC 1 is to forward the media packets it receives for session 1.

In step 378, SBC 1 determines, generates, and/or calculates its current resource utilization metrics. In step 386, the SBC 1 211 generates and sends resource utilization report 387 which includes its current resource utilization metrics to SLB 1 205. Operation proceeds from step 386 to step 388. In step 388, the SLB 1 205 receives and processes the SBC 1 resource utilization report 387.

In step 390, SBC 45 217 determines, generates, and/or calculates its current resource utilization metrics. In step 392 the SBC 45 217 generates and sends resource utilization report 393 which includes its current resource utilization metrics to SLB 1 205. Operation proceeds from step 392 to step 394. In step 394, the SLB 1 205 receives and processes the SBC 45 217 resource utilization report 393.

In step 395, SBC 72 219 determines, generates, and/or calculates its current resource utilization metrics. In step 396 the SBC 72 219 generates and sends resource utilization report 397 which includes its current resource utilization metrics to SLB 1 205. Operation proceeds from step 396 to step 398. In step 398, the SLB 1 205 receives and processes the SBC 72 219 resource utilization report 397. While the determination and reporting of utilization metrics has been shown for three SBCs of the first cluster of SBC 370 it should be understand that each of the SBCs of the first cluster generate and report their resource utilization metrics to the SLB 1 on an on-going basis.

In step 399, the method continues with the SLB 1 205 using the current resource utilization metrics received from the SBCs of the first cluster of SBCs to base its load balancing selections for distributing initial session and re-directed session among the SBCs of the first cluster of SBCs 370.

The resource utilization metrics in some embodiments includes metrics described in detail above for example, U(s), U(m), U(t), and U(a) resource utilization metrics.

It should be understood that the method/signaling diagram 300 generally illustrates an example of the initial load balancing by SLB 1, determination by the selected SBC for the session that it is a mismatch for the session based on the resources, e.g., hardware capabilities, of the node on which it is executing, notification by the selected SBC to the SLB that there has been a session mismatch with a request for redirection of the session to a more suitable node, a second load balancing determination/selection by the SLB in response to the mismatch redirection request, followed by the redirection of the session. The load balancing selection of the SBC to which the session will be sent being made based on expected traffic patterns and resource utilization information provided by the SBCs of the cluster. In the example, the mismatch was that the session required transcoding and the SBC was a signaling only SBC. It should be understood that this was only an exemplary mismatch of resources and that the invention is applicable to other resource mismatches. As previously described other session mismatch are also applicable and included within the scope of the invention. For example, a mismatch of a transcoding SBC or a passthrough SBC being selected for session that does not require media transcoding or passthrough. Mismatch of a passthrough/media anchoring SBC being selected for a session requiring transcoding. Mismatch of a signaling only SBC selected for a session requiring media passthrough/media anchoring/media relay. The invention allows for the rebalancing of sessions among a cluster of SBC based on hardware capabilities and resource utilization to increase efficiency of the utilization of the resources, e.g., hardware resources and capabilities, available to the cluster. The SLB re-balancing and selections decisions being based on information about the resources required for a session which where unknown to the SBL at the time of initial load balancing and selection decision.

In various embodiments, the resource utilization metrics are also provided the orchestrator, system manager, and/or autoscaler(s) that are responsible for managing the cluster of SBCs 370. The resource utilization metrics then being used by the orchestrator, system manager, and/or autoscaler(s) to dynamically reconfigure the cluster of SBCs based on resource utilization and traffic conditions. For example, by adding or removing SBC worker and/or nodes based on the resource utilization metrics, e.g., when a first resource utilization metric threshold value is exceeded adding an SBC and/or node of the particular type required to reduce the resource utilization metric threshold value exceeded.

Figure 6A:
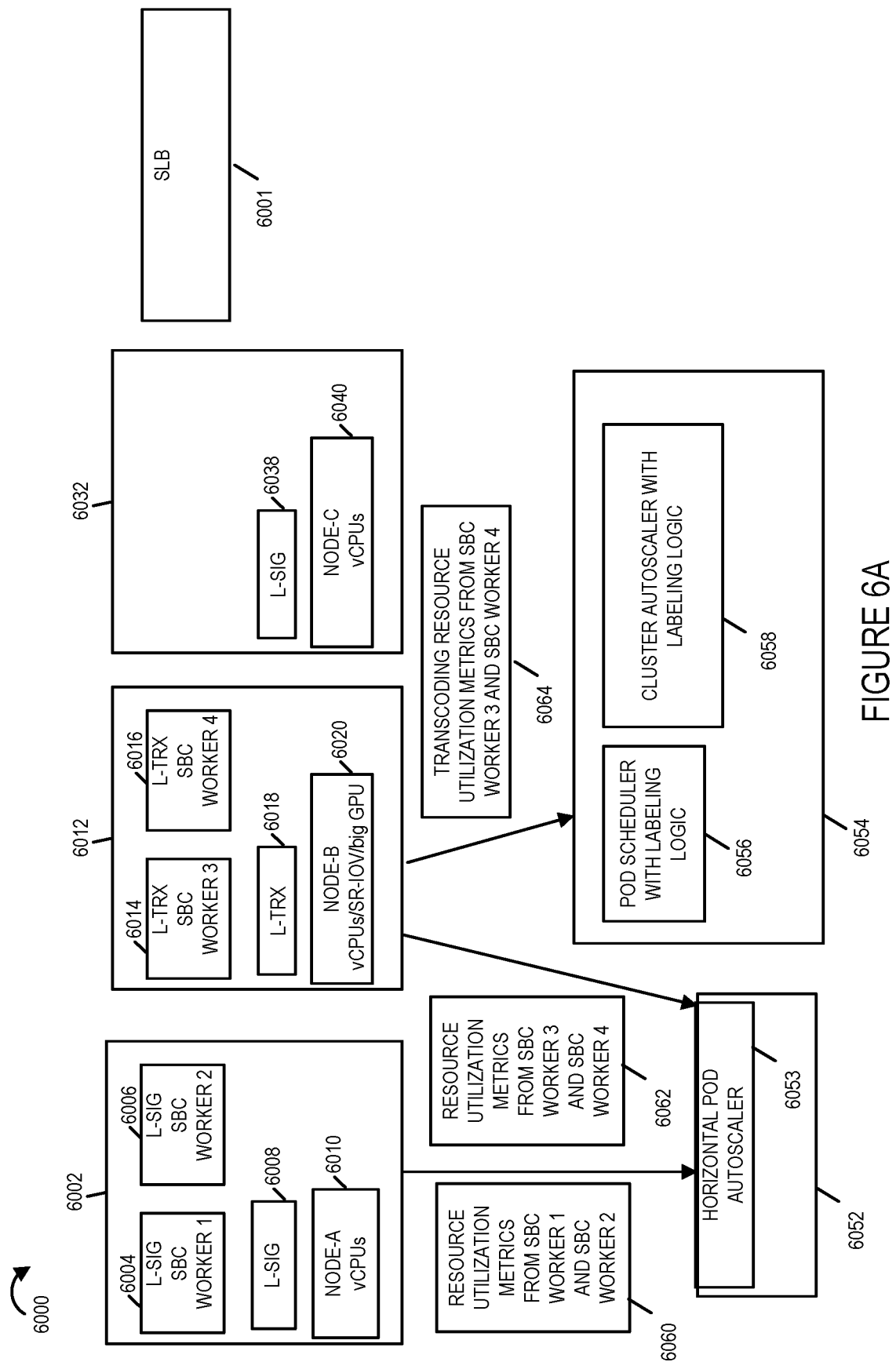
FIG. 6A illustrates a communications system in accordance with an embodiment of the present invention before the dynamic reconfiguration of the system.
Figure 6B:
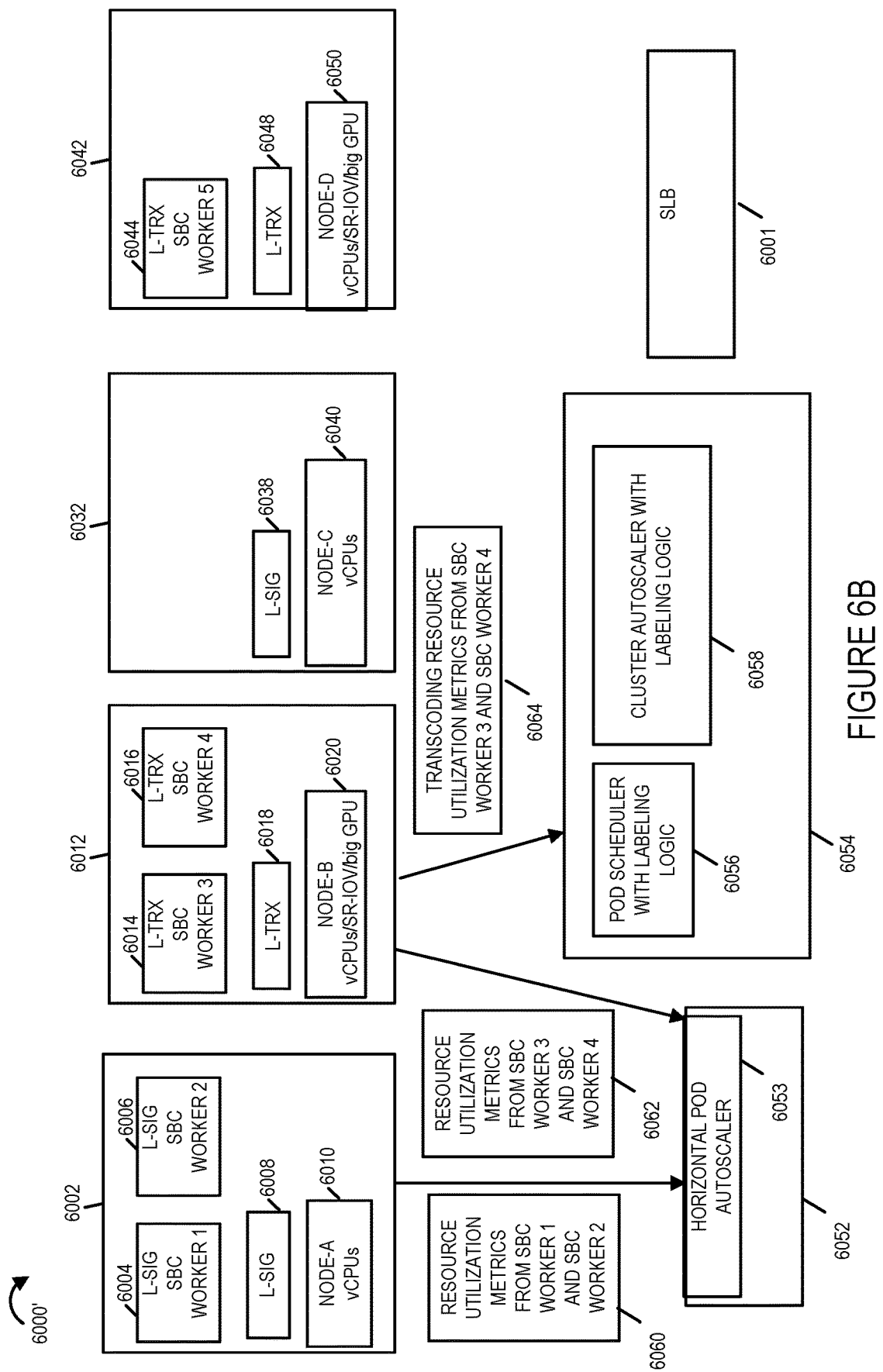
FIG. 6B illustrates the communications system shown in FIG. 6A after the dynamic reconfiguration of the system to add a new node and SBC worker.

FIG. 7 comprises FIGS. 7A, 7B, and 7C. FIG. 7A is a first part of a flowchart of exemplary method illustrating the dynamic reconfiguration of a system including a cluster of nodes and pods operating on the nodes in accordance with an embodiment of the present invention. FIG. 7B is a second part of a flowchart of exemplary method illustrating the dynamic reconfiguration of a system including a cluster of nodes and pods operating on the nodes in accordance with an embodiment of the present invention. FIG. 7C is a third part of a flowchart of exemplary method illustrating the dynamic reconfiguration of a system including a cluster of nodes and pods operating on the nodes in accordance with an embodiment of the present invention. The method of FIG. 7 will be explained in connection with exemplary system 6000 shown in FIG. 6A and the modified system 6000' shown in FIG. 6B. FIG. 6A illustrates a communications system in accordance with an embodiment of the present invention before the dynamic reconfiguration of the system. FIG. 6B illustrates the communications system shown in FIG. 6A after the dynamic reconfiguration of the system to add a new node and SBC worker.

The system 6000 shown the system with the cluster of nodes/SBC worker prior to dynamically changing the cluster and system 6000' shown on FIG. 6B shows the dynamically changed/reconfigured system. In the example illustrated in FIGS. 6A and 6B. The system detects through monitoring of resource utilization metrics that an additional transcoding SBC is needed. The system further determines that while a Node C is available it does not have the required hardware capabilities so a new Node D with the required hardware capabilities is added to system shown in 6000' FIG. 6B and a new SBC worker 5 POD 6044 is scheduled/placed on the new Node D.

Operation starts in step 702 and proceeds to step 704.

In step 704, a cluster of four SBC worker PODs are configured in a system (e.g., Kubernetes system 6000 shown in FIG. 6A). The SBC worker 1 POD (e.g., FIG. 6A SBC Worker 1 6004) and SBC worker 2 POD (e.g., SBC Worker 2 6006) being located on node A (e.g., Node A 6002 of system 6000). SBC worker 3 POD (SBC Worker 3 6014 of system 6000) and SBC worker 4 POD (SBC Worker 4 6016 of system 6000) being located on Node B (Node B 6012 of system 6000). Node A has vCPUs resources (Node A resources 6010). Node B has vCPUs resources, SR-IOV resources, and GPU resources (Node B resources 6020) Node A is labeled as a signaling only node (L-SIG label 6008). Node B is labelled as a transcoding node (L-TRX label 6018). SBC Worker 1 is labeled as a signaling SBC (L-SIG 6004). SBC Worker 2 is labeled as a signaling label (L-SIG 6006). SBC Worker 3 is labeled as a transcoding SBC (L-TRX 6014). SBC Worker 4 is labeled as a transcoding SBC (L-TRX 6016. Operation proceeds from step 704 to step 706.

A SLB (6001 FIGS. 6A, 6B is operated to load balance initial and redirected sessions, e.g., SIP sessions, across the cluster of four SBC worker PODs of the cluster. Operation proceeds from step 706 to step 708.

In step 708, generate resource utilization metrics, e.g., aggregate resource utilization metrics at SBC worker 1 on Node A and SBC worker 2 on Node A, SBC worker 3 on Node B and SBC worker 4 on Node B. Operation proceeds from step 708 to step 710, generate transcoding resource utilization metrics, e.g., aggregate resource utilization metrics at SBC worker 3 on Node B and SBC worker 4 on Node B. Operation proceeds from step 710 to step 712.

In step 712, communicate the generated resource utilization metrics from the SBC worker 1 POD, SBC worker 2 POD, SBC worker 3 POD, SBC worker 4 POD) to a Horizontal POD autoscaler ((see FIG. 6A 6060 and 6062 resource utilization metrics being sent to horizontal POD autoscaler 6053 on node 6052). Operation proceeds from step 712 to step 714.

In step 714, communicate the generated transcoding resource utilization metrics from the SBC worker 3 POD and SBC worker 4 POD to a POD scheduler with labeling logic (FIG. 6A 6056) and a cluster autoscaler with labeling with logic. (FIG. 6A 6058) (See FIG. 6A transcoding resource utilization metrics from SBC worker 3 and SBC worker 4 sent to node 6054 which includes POD scheduler with labeling logic 6056 and cluster autoscaler with labeling logic 6058).

Operation proceeds from step 714 to step 715. In step 715, determine at the horizontal POD Autoscaler whether or not the cluster of SBC worker PODS should be dynamically re-configured based on the received resource utilization metrics (e.g., based on the aggregated resource utilization metrics). Operation proceeds from step 715 via connection node A 716 to step 718 shown on FIG. 7B.

In step 718, when the determination is that a dynamic reconfiguration of the cluster should be performed, determine by the horizontal POD autoscaler whether a SBC worker POD should be deleted or added. Operation proceeds from step 718 to step 720.

In step 720, when the determination is that a SBC worker POD should be deleted determine which of the four SBC worker PODs to delete and delete the SBC worker POD selected/determined for deletion. Operation proceeds from step 720 to step 722.

In step 722, when the determination is that a SBC worker POD should be added, create by the horizontal POD autoscaler a fifth SBC worker POD, SBC worker 5 POD. In FIG. 6A, the horizontal POD autoscaler determines that a SBC Worker POD should be added and creates a SBC worker 5 POD. Operation proceeds from step 722 to step 724.

In step 724, upon creation of the SBC worker 5 POD, a POD scheduler with labeling logic (POD scheduler 6056 FIG. 6A) determines based on the communicated resource utilization metrics what type of label to place on the SBC Worker 5 POD, e.g., based on transcoding resource utilization metrics the POD scheduler may make the determination to lable the SB worker 5 POD with label-transcoding TRX. Operation proceeds from step 724 to step 726.

In step 726, determine, by the cluster autoscaler with labeling logic (FIG. 6A cluster autoscaler 6058) whether there are currently any nodes in the system (FIG. 6A 6000) which are available and have the required resources for the created SBC worker 5 POD. For example, in FIG. 6A the cluster autoscaler 6058 determines that while node C 6032 is available in the system it only has vCPUs 6040 and node C is labeled as a signaling node (Figure L-SIG 6038), so cluster autoscaler 6058 determines there are no available nodes currently available in the system which have the required resources. The Node B has the required resources but is being utilized as a transcoding node already with SBC worker 3 and SBC worker 4.

Operation proceeds from step 726 to step 728. In step 728, when the determination is that a node with the required resources is available schedule the SBC worker 5 POD on the Node with the available resources which are required for the SBC worker 5 POD type (e.g., SBC signaling only, SBC media passthrough/media anchoring/media relay, SBC transcoding).

Operation proceeds from step 728 to step 730. In step 730, when the determination is that a node with the required resources is not available the cluster autoscaler creates or adds a node with the required resources for the SBC worker 5 POD type and labels the node with a label describing the node's resources (e.g., create a new node D with resources Big GPU/L-TRX label when a transcoding SBC worker is required and no nodes exist with the available transcoding big GPU resource. This is the case with the example of FIGS. 6A and 6B. In FIG. 6B, the cluster autoscaler 6058 create node D 6042 and labels Node D as being L-TRX (transcoding node). The hardware resources of Node D are vCPUs/SR-IOV/big GPU 6050.

Operation proceeds from step 730 via connection node B 732 to step 734 shown on FIG. 7C. In step 734, the SBC worker 5 on the created new node, e.g., Node D. In system 6000' of FIG. 6B the SBC Worker 5 POD 6044 is scheduled on Node D 6042. It includes the L-TRX label. Operation proceeds from step SBC 734 to step 736. In step 736, SBC Worker 5 POD partitions its resources for transcoding role. Operation proceeds from step 736 to step 738.

In step 736, the SLB notified of the addition of the SBC worker 5 POD and begins distributing sessions to the SBC worker 5 POD. Operation proceeds from step 738 to step 740.

In step 740, the system, e.g., horizontal POD autoscaler, monitors for resource utilization metrics and makes additional dynamic configuration changes to the cluster based on the monitored metrics. Though not shown when the system determines not changes are necessary operation continues to monitor the resource utilization metrics without making any changes to the configuration of the cluster.

FIG. 8 is a flowchart 750 of an exemplary method making dynamic configuration changes to a cluster based on monitored metrics in accordance with an exemplary embodiment. The method 752 may be, and in some embodiments, is implemented on communications system 200 shown in FIG. 2.

Operation starts in step 752 and proceeds to step 754.

In step 754 a horizontal pod autoscaler is operated to determine, based on metrics (e.g., aggregated resource utilization metrics), whether or not a new pod, e.g., a new SBC worker pod, is needed. In step 756, in response to a determination that a new pod is needed, the horizontal pod autoscaler is operated to notify a pod scheduler, which includes labeling logic, that a new pod is needed, e.g., the horizontal pod autoscaler sends a new pod request to the scheduler.

Operation proceeds from step 756 to step 758. In step 758 the scheduler is operated to receive the new pod request.

Operation proceeds from step 758 to step 760. In step 760 the pod scheduler, using its labeling logic, adds the appropriate label for the new pod request based on metrics (e.g., transcoding resource utilization metrics).

Operation proceeds from step 760 to step 762. In step 762 the cluster autoscaler checks whether or not there is an existing node) with the label matching the label of the new pod request. In step 764, in response to the cluster autoscaler determining that there is an existing node with the label matching the label of the new pod request, the cluster autoscaler is operated to refrain from creating a new node. In step 766 in response to the cluster autoscaler determining that there is not an existing node with the label matching the label of the new pod request, the cluster autoscaler is operated to create a new node with resources required for the label of the new pod, and cluster autoscaler is further operated to label the newly created node with same type of label as the label of the new pod request.

Operation proceeds from step 766 to step 768. In step 768 the cluster autoscaler is operated to start the new pod on the new node.

Figure 9:
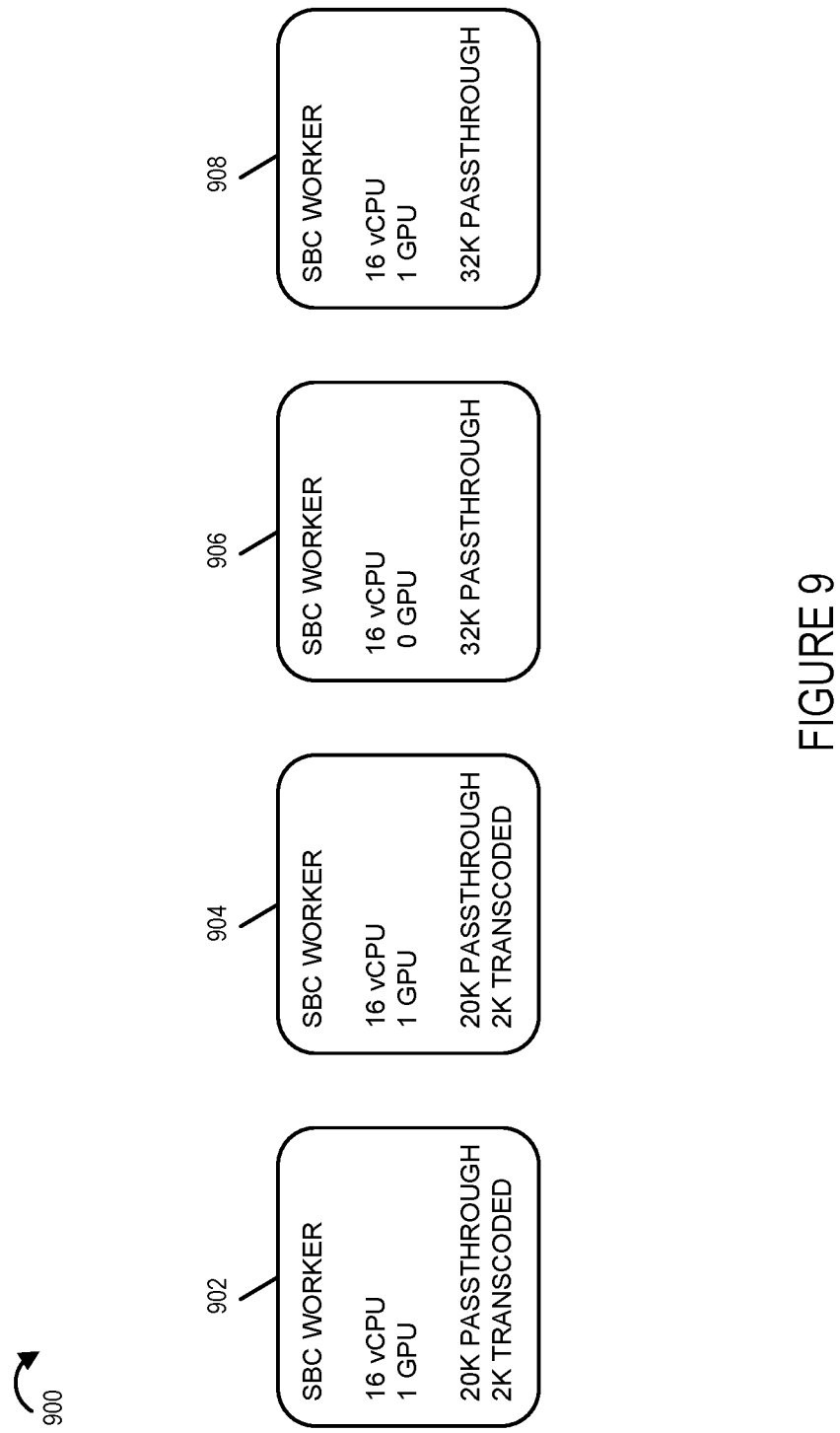
FIG. 9 illustrates a cluster of four nodes showing hardware resources/capabilities of each node.

FIG. 9 illustrates a cluster of four nodes 902, 904, 906, and 908. and the hardware resources/capabilities of each of the nodes. Each node having an SBC worker application or POD executing on the node forming a cluster of 4 SBC workers. The node 902 includes 16 vCPU and 1 GPU. The hardware resources/capabilities of node 902 allow it handle/process 20K passthrough sessions and 2K transcoded sessions. The node 904 includes 16 vCPU and 1 GPU. The hardware resources/capabilities of node 904 allow it handle/process 20K passthrough sessions and 2K transcoded sessions. The node 906 includes 16 vCPU and 0 GPU. The hardware resources/capabilities of node 906 allow it handle/process 32K passthrough sessions. The node 908 includes 16 vCPU and 1 GPU. The hardware resources/capabilities of node 908 allow it handle/process 20K passthrough sessions.

Figure 10:
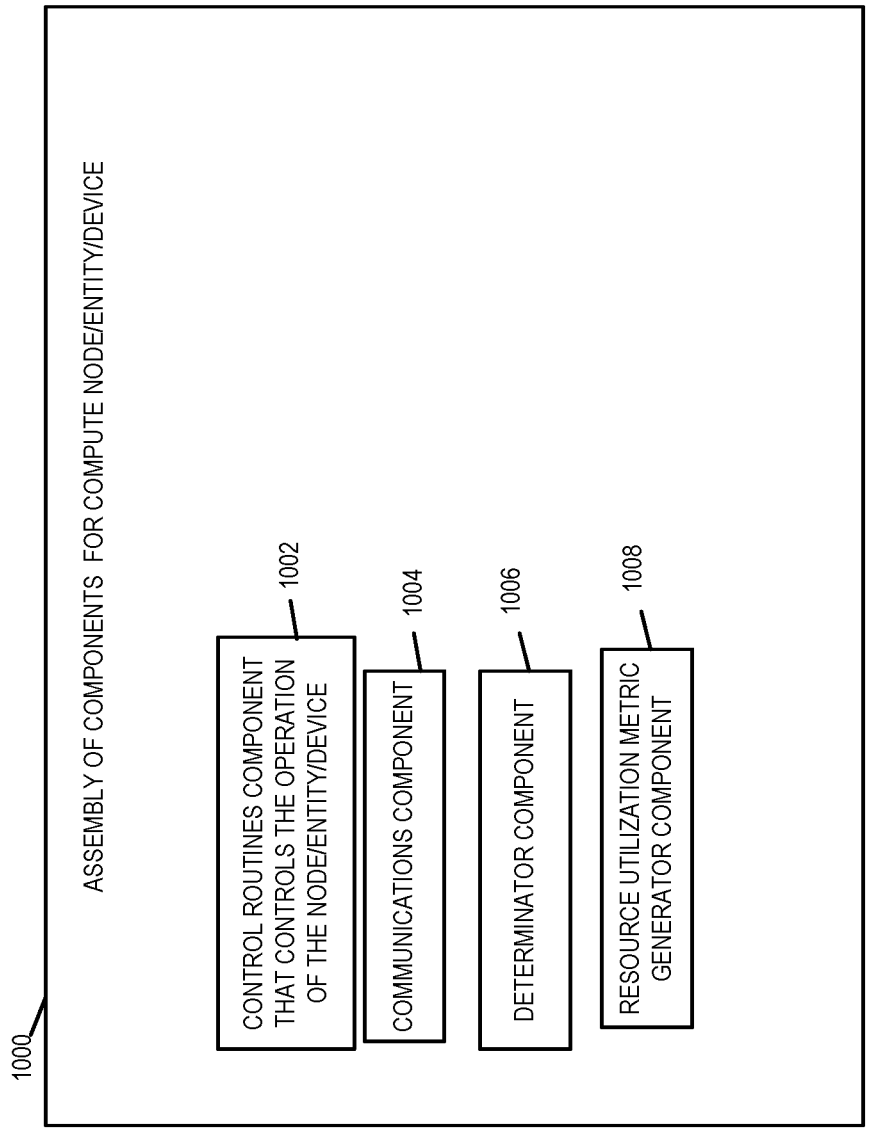
FIG. 10 illustrates an exemplary assembly of components for a compute node, entity, or device.

FIG. 10 is a drawing illustrating an assembly of components 1000 which may be included in a computing node/entity/device 500 of FIG. 5 implemented in accordance with an exemplary embodiment of the present invention. Assembly of components 1000 may be, and in some embodiments is, used in compute device/entity/node 500. The components in the assembly of components 1000 can, and in some embodiments are, implemented fully in hardware within the processor 506, e.g., as individual circuits. The components in the assembly of components 1000 can, and in some embodiments are, implemented fully in hardware within the assembly of components 519, e.g., as individual circuits corresponding to the different components. In other embodiments some of the components are implemented, e.g., as circuits, within the processor 506 with other components being implemented, e.g., as circuits within assembly of components 519, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 510 of the computing node/entity/device 500, with the components controlling operation of computing node/entity/device 500 to implement the functions corresponding to the components when the components are executed by a processor, e.g., processor 506. In some such embodiments, the assembly of components 1000 is included in the memory 510 as assembly of components 518. In still other embodiments, various components in assembly of components 1000 are implemented as a combination of hardware and software, e.g., with another circuit external to the processor providing input to the processor 506 which then under software control operates to perform a portion of a component's function. While shown in the FIG. 5 embodiment as a single processor, e.g., computer, it should be appreciated that the processor 506 may be implemented as one or more processors, e.g., computers.

When implemented in software the components include code, which when executed by the processor 506, configure the processor 506 to implement the function corresponding to the component. In embodiments where the assembly of components 100 is stored in the memory 510, the memory 510 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 1000 control and/or configure the computing node/entity/device 500 or elements therein such as the processor 506, to perform the functions of corresponding steps illustrated and/or described in the methods and signaling diagrams and flowchart of FIGS. 3, 7, and 8 and/or described with respect to any of the Figures or embodiments described herein. Thus, the assembly of components 1000 includes various components that perform functions of corresponding steps of methods described herein.

Assembly of components 1000 includes components 1002, 1004, 1006, and 1008. Not all components in the assembly of components need to be implemented in a particular device. The particular components implemented depends on the device in which they are included.

The control routines component 1002 is configured to control the operation of the node/entity/device.

The communications component 1004 is configured to provide communications functionality including communications signaling and support for various communications protocols and interfaces. The communications component 1004 includes functionality for generating, transmitting, receiving and processing messages including for example, session mismatch redirection request messages, internal redirection request messages, redirection request messages, notification messages, internal redirection to transcoding SBC messages, internal redirection to signaling SBC message, internal redirection to passthrough/media anchor/media relay messages, and resource utilization reporting messages.

The determinator component 1006 makes determinations for node/entity/device for example when the entity is a SBC it makes the following exemplary determinations: resource utilization metrics for the SBC, whether or not there has been a session mismatch, whether to send a session mismatch redirection request to the SLB, whether to forward media packets to another SBC worker that has taken over a session form the SLB after a redirection. When the entity is a SLB, the determinator component 1006, makes the following exemplary determinations: selection or determination of which SBC from a cluster of SBCs to send initial session initiation or establishment requests (e.g., SIP INVITE request), selection or determination of which SBC from a cluster of SBCs to redirect a session, determination as to which SBC to send received session signaling messages to (e.g., SIP messages). When the entity is a cluster autoscaler, exemplary determinations include: the determination of whether an available node in the cluster has the necessary resources when a new SBC is to be added or whether a new node needs to be created, what label to place on the new node upon its creation, whether a node is to be added or removed from the cluster of nodes. When the entity is a horizontal POD autoscaler exemplary determinations include: whether a new SBC POD needs to be added to a cluster of SBC PODs or whether a SBC POD should be removed from the cluster of PODs.

Resource utilization metric generator component 1006 generates resource utilization metrics for the entity such as an SBC and/or a node.

Various exemplary numbered embodiments illustrating different features of the present invention will now be discussed.

List of Exemplary Numbered Method Embodiments

Method Embodiment 1. A communications method, comprising: receiving from a first device at a Signaling Front End Load Balancer (SLB) a first session initiation request (e.g., SIP Invite request) destined for a second device; making a first session load balancing decision at the SLB with respect to the received first session initiation request; transmitting the first session initiation request to a first Session Border Controller (SBC) worker based on said first load balancing decision, said first SBC worker being one of a plurality of SBC workers forming a cluster of SBC workers, wherein each of said SBC workers is implemented on a node, said first SBC worker being implemented on a first node and a second SBC worker of the cluster of SBC workers being implemented on a second node, said first node and said second node being different nodes; making a session mismatch determination at the first SBC worker with respect to a first session corresponding to the first session initiation request; and when said session mismatch determination is that a session mismatch has occurred notifying the SLB of the session mismatch.

Method Embodiment 1A. The communications method of Method Embodiment 1, further comprising: when said session mismatch determination at the first SBC worker with respect to the first session is that no session mismatch has occurred notifying the SLB that a session mismatch has not occurred with respect to the first session initiation request (e.g., by sending an acceptance message for the first session which corresponds to the first session initiation request or a confirmation message that the first SBC worker will handle all the processing required for the first session corresponding to the first session initiation request (e.g., signaling, media anchoring and/or media transcoding processing).

Method Embodiment 1B. The communications method of Method Embodiment 1, further comprising: when said session mismatch determination at the first SBC worker with respect to the first session is that no session mismatch has occurred refraining from notifying the SLB that a session mismatch has occurred with respect to the first session initiation request.

Method Embodiment 2. The communications method of Method Embodiment 1, wherein the SBC workers are implemented on a plurality of different nodes, at least some of said different nodes having different hardware capabilities.

Method Embodiment 2A1. The communications method of Method Embodiment 2, wherein each of the SBC workers of the cluster of SBC workers has the same functionality.

Method Embodiment 2A. The communications method of Method Embodiment 2, wherein the plurality nodes include a first set of nodes and a second set of nodes, said second set of nodes having different capabilities than said first set of nodes.

Method Embodiment 2AA. The communications method of Method Embodiment 2A, wherein the first set of nodes includes hardware for performing session signaling protocol processing (e.g., Session Initiation Protocol (SIP) message processing and/or Session Description Protocol (SDP) message processing); and wherein the second set of nodes includes: (i) hardware for performing session signaling protocol processing (e.g., Session Initiation Protocol (SIP) message processing and/or Session Description Protocol (SDP) message processing), and (ii) hardware for performing session media processing (e.g., media relaying of media for a passthrough session or traffic).

Method Embodiment 2B. The communications method of Method Embodiment 2A, wherein the plurality of nodes further includes a third set of nodes, said third set of nodes having different hardware capabilities than said first set of nodes and having different hardware capabilities than said second set of nodes.

Method Embodiment 2BB. The communications method of Method Embodiment 2B, wherein the first set of nodes includes hardware for performing session signaling protocol processing (e.g., Session Initiation Protocol (SIP) message processing and/or Session Description Protocol (SDP) message processing); wherein the second set of nodes includes: (i) hardware for performing session signaling protocol processing (e.g., Session Initiation Protocol (SIP) message processing and/or Session Description Protocol (SDP) message processing), and (ii) hardware for performing session media processing (e.g., media relaying of media for a passthrough session or traffic); and wherein the third set of nodes includes: (i) hardware for performing session signaling protocol processing (e.g., Session Initiation Protocol (SIP) message processing and/or Session Description Protocol (SDP) message processing), (ii) hardware for performing session media processing (e.g., media relaying for a passthrough session or traffic); and (iii) hardware for performing media transcoding of media of a session.

Method Embodiment 2BBB. The communications method of Method Embodiment 2BB, wherein said hardware for performing session signaling protocol processing includes virtual CPUs; wherein said hardware for performing session media processing includes one or more interfaces with Single Route I/O virtualization capabilities; and wherein said hardware for performing media transcoding of media of a session includes one or more GPUs.

Method Embodiment 2C. The communications method of Method Embodiment 2, wherein said different hardware capabilities include different hardware resources (e.g., hardware resources optimized and/or available for implementing specific operations, tasks or functions such as a first node with hardware resources optimized and/or available for performing session signaling only, a second node with hardware resources optimized and/or available for performing session signaling and media relay, and a third node with hardware resources optimized and/or available for perform session signaling, media relay and media transcoding).

Method Embodiment 2D. The communications method of Method Embodiment 2, wherein the first node has different hardware resources or capabilities than the second node.

Method Embodiment 3. The communications method of Method Embodiment 1, wherein said making said first load balancing decision at the SLB with respect to the received first session initiation request includes: determining by the SLB to which SBC worker of the cluster of SBC workers to distribute the first session initiation request based on an expected traffic mixture (e.g., percentage of different types of traffic or sessions expected to be received such as: (i) percentage of total expected traffic or sessions requiring only signaling processing, (ii) percentage of total traffic or sessions requiring signaling processing and media processing (e.g., passthrough media traffic or sessions where media of the session requires anchoring) and (iii) percentage of total expected traffic or sessions requiring signaling processing, media processing and media transcoding).

Method Embodiment 4. The communications method of Method Embodiment 2, wherein said determining by the SLB to which SBC worker of the cluster of SBC workers to distribute the first session initiation request is further based on hardware capabilities of the node on which each SBC worker is implemented.

Method Embodiment 4A. The communications method of Method Embodiment 2, wherein said determining by the SLB to which SBC worker of the cluster of SBC workers to distribute the first session initiation request is further based on reported session utilization values received from SBC workers of the cluster of SBC workers.

Method Embodiment 7. The communications method of Method Embodiment 1, wherein the SLB entity is a Kubernetes POD; and wherein the SBC workers of the cluster are Kubernetes PODs located on different Kubernetes nodes.

Method Embodiment 8. The communications method of Method Embodiment 1, wherein the SBC workers are implemented as native applications on a plurality of different nodes, said nodes being located in the cloud; and wherein at least some of the different nodes have different hardware capabilities.

Method Embodiment 9. The communications system of Method Embodiment 1, wherein said first SBC worker makes said session mismatch determination based on hardware capabilities of the first node and operation to be performed by the first SBC worker for the first session.

Method Embodiment 9A. The communications method of Method Embodiment 1, wherein said making a session mismatch determination at the first SBC worker with respect to a first session corresponding to the first session initiation request includes determining by the first SBC worker that the first node does not have one or more hardware capabilities, said one or more hardware capabilities including a Graphics Processing Unit for transcoding media and said session requiring media transcoding.

Method Embodiment 9B. The communications method of Method Embodiment 1 further comprising: in response to receiving the session mismatch message from the first SBC worker with respect to the first session, making a second load balancing decision with respect to the first session and selecting the second SBC worker to redirect the first session to; sending a message to the second SBC worker notifying the second SBC worker that the first session is to be redirected to the second SBC worker; and sending a notification to the first SBC worker that the first session has been redirected to the second SBC worker.

Method Embodiment 9C. The communications method of Method Embodiment 9B, wherein the second load balancing is based on resource utilization metrics received from the SBC workers of the cluster of SBC workers and information received from the first SBC about the first session.

Method Embodiment 9D. The communications method of Method Embodiment 9C, wherein the information received from the first SBC about the first session is that the first session is to be redirect to a SBC worker located on a node with transcoding hardware capabilities (e.g., a GPU); and wherein the second node includes transcoding hardware capabilities.

Method Embodiment 9E. The communications method of Method Embodiment 9D, further comprising: upon receiving SIP messages from the first device for the first session at the SLB subsequent to redirecting the first session to the second SBC worker, forwarding by the SLB said received SIP messages or SIP messages generated based on said received SIP signaling messages directly to the second SBC worker 2 on the second node; and upon receiving media packets of the first session at the first SBC worker subsequent to the first session being redirected to the second SBC worker forwarding the received media packets of the second session to the second SBC worker on the second node.

Method Embodiment 9F. The communications method of Method Embodiment 9D, wherein the first session continues to utilize a media IP address and port of the first SBC worker after the first session has been redirected to the second SBC worker, and wherein the first SBC worker forwards any media packets received on the media IP address and port being used for the first session to the second SBC worker.

Method Embodiment 9G. The communications method of Method Embodiment 9F, further comprising: determining, by the second SBC worker, that a session mismatch has occurred with respect to the first session when transcoding of media is no longer required for the first session, and sending a session mismatch message to the SLB notifying the SLB that a session mismatch has occurred with respect to the first session and requesting the first session be redirected to a SBC worker operating on a node with capabilities for media anchoring; making a third load balancing decision at the SLB for the first session and selecting another SBC from the cluster of SBC which is located on a node with hardware capabilities (e.g., SR-IOV) for media anchoring but not for transcoding; and notifying the selected SBC that the first session is to be redirected to the selected SBC.

List of Exemplary Numbered System Embodiments

System Embodiment 1. A communications system, comprising: a Signaling Front End Load Balancer (SLB) entity located on a node including a processor the processor controlling the SLB entity to: receive from a first device a first session initiation request (e.g., SIP Invite request) destined for a second device; make a first session load balancing decision at the SLB with respect to the received first session initiation request; transmit the first session initiation request to a first Session Border Controller (SBC) worker based on said first load balancing decision, said first SBC worker being one of a plurality of SBC workers forming a cluster of SBC workers, wherein each of said SBC workers is implemented on a node, said first SBC worker being implemented on a first node and a second SBC worker of the cluster of SBC workers being implemented on a second node, said first node and said second node being different nodes; and wherein said first SBC worker makes a session mismatch determination with respect to a first session corresponding to the first session initiation request; and when said session mismatch determination is that a session mismatch has occurred the first SBC worker notifies the SLB of the session mismatch.

System Embodiment 1A. The communications system of System Embodiment 1, further comprising: when said session mismatch determination at the first SBC worker with respect to the first session is that no session mismatch has occurred notifying the SLB that a session mismatch has not occurred with respect to the first session initiation request (e.g., by sending an acceptance message for the first session which corresponds to the first session initiation request or a confirmation message that the first SBC worker will handle all the processing required for the first session corresponding to the first session initiation request (e.g., signaling, media anchoring and/or media transcoding processing).

System Embodiment 1B. The communications system of System Embodiment 1, further comprising: when said session mismatch determination at the first SBC worker with respect to the first session is that no session mismatch has occurred refraining from notifying the SLB that a session mismatch has occurred with respect to the first session initiation request.

System Embodiment 2. The communications system of System Embodiment 1, wherein the SBC workers are implemented on a plurality of different nodes, at least some of said different nodes having different hardware capabilities.

System Embodiment 2A1. The communications system of System Embodiment 2, wherein each of the SBC workers of the cluster of SBC workers has the same functionality.

System Embodiment 2A. The communications system of System Embodiment 2, wherein the plurality nodes include a first set of nodes and a second set of nodes, said second set of nodes having different capabilities than said first set of nodes.

System Embodiment 2AA. The communications system of System Embodiment 2A, wherein the first set of nodes includes hardware for performing session signaling protocol processing (e.g., Session Initiation Protocol (SIP) message processing and/or Session Description Protocol (SDP) message processing); and wherein the second set of nodes includes: (i) hardware for performing session signaling protocol processing (e.g., Session Initiation Protocol (SIP) message processing and/or Session Description Protocol (SDP) message processing), and (ii) hardware for performing session media processing (e.g., media relaying of media for a passthrough session or traffic).

System Embodiment 2B. The communications system of System Embodiment 2A, wherein the plurality of nodes further includes a third set of nodes, said third set of nodes having different hardware capabilities than said first set of nodes and having different hardware capabilities than said second set of nodes.

System Embodiment 2BB. The communications system of System Embodiment 2B, wherein the first set of nodes includes hardware for performing session signaling protocol processing (e.g., Session Initiation Protocol (SIP) message processing and/or Session Description Protocol (SDP) message processing); wherein the second set of nodes includes: (i) hardware for performing session signaling protocol processing (e.g., Session Initiation Protocol (SIP) message processing and/or Session Description Protocol (SDP) message processing), and (ii) hardware for performing session media processing (e.g., media relaying of media for a passthrough session or traffic); and wherein the third set of nodes includes: (i) hardware for performing session signaling protocol processing (e.g., Session Initiation Protocol (SIP) message processing and/or Session Description Protocol (SDP) message processing), (ii) hardware for performing session media processing (e.g., media relaying for a passthrough session or traffic); and (iii) hardware for performing media transcoding of media of a session.

System Embodiment 2BBB. The communications system of System Embodiment 2BB, wherein said hardware for performing session signaling protocol processing includes virtual CPUs; wherein said hardware for performing session media processing includes one or more interfaces with Single Route I/O virtualization capabilities; and wherein said hardware for performing media transcoding of media of a session includes one or more GPUs.

System Embodiment 2C. The communications system of System Embodiment 2, wherein said different hardware capabilities include different hardware resources (e.g., hardware resources optimized and/or available for implementing specific operations, tasks or functions such as a first node with hardware resources optimized and/or available for performing session signaling only, a second node with hardware resources optimized and/or available for performing session signaling and media relay, and a third node with hardware resources optimized and/or available for perform session signaling, media relay and media transcoding).

System Embodiment 2D. The communications system of System Embodiment 2, wherein the first node has different hardware resources or capabilities than the second node.

System Embodiment 3. The communications system of System Embodiment 1, wherein said making said first load balancing decision at the SLB with respect to the received first session initiation request includes: determining by the SLB to which SBC worker of the cluster of SBC workers to distribute the first session initiation request based on an expected traffic mixture (e.g., percentage of different types of traffic or sessions expected to be received such as: (i) percentage of total expected traffic or sessions requiring only signaling processing, (ii) percentage of total traffic or sessions requiring signaling processing and media processing (e.g., passthrough media traffic or sessions where media of the session requires anchoring) and (iii) percentage of total expected traffic or sessions requiring signaling processing, media processing and media transcoding).

System Embodiment 4. The communications system of System Embodiment 2, wherein said determining by the SLB to which SBC worker of the cluster of SBC workers to distribute the first session initiation request is further based on hardware capabilities of the node on which each SBC worker is implemented.

System Embodiment 4A. The communications system of System Embodiment 2, wherein said determining by the SLB to which SBC worker of the cluster of SBC workers to distribute the first session initiation request is further based on reported session utilization values received from SBC workers of the cluster of SBC workers.

System Embodiment 5. A communications system, comprising: a Signaling Front End Load Balancer (SLB) entity executing on a node including a processor, said processor controlling the SLB to: receive from a first device at a first session initiation request (e.g., SIP Invite request) destined for a second device; make a first session load balancing decision at the SLB with respect to the received first session initiation request; transmit the first session initiation request to a first Session Border Controller (SBC) worker based on said first load balancing decision, said first SBC worker being one of a plurality of SBC workers forming a cluster of SBC workers, wherein each of said SBC workers is implemented on a node, said first SBC worker being implemented on a first node and a second SBC worker of the cluster of SBC workers being implemented on a second node, said first node and said second node being different nodes; and receive a notification of session mismatch from the first SBC worker when the first SBC worker makes a session mismatch determination with respect to a first session corresponding to the first session initiation request that a session mismatch has occurred with respect to the first session.

List of Exemplary Numbered Non-Transitory Computer Readable Medium Embodiments

A non-transitory computer readable medium including a first set of computer executable instructions which when executed by a processor of a Signal Front End Load Balancer (SLB) entiy cause the SLB entity to perform the steps of: receiving from a first device at the Signaling Front End Load Balancer (SLB) entity of the node a first session initiation request (e.g., SIP Invite request) destined for a second device; making a first session load balancing decision at the SLB with respect to the received first session initiation request; transmitting the first session initiation request to a first Session Border Controller (SBC) worker based on said first load balancing decision, said first SBC worker being one of a plurality of SBC workers forming a cluster of SBC workers, wherein each of said SBC workers is implemented on a node, said first SBC worker being implemented on a first node and a second SBC worker of the cluster of SBC workers being implemented on a second node, said first node and said second node being different nodes; and wherein said first SBC workers makes a session mismatch determination at the first SBC worker with respect to a first session corresponding to the first session initiation request; and when said session mismatch determination is that a session mismatch has occurred said first SBC notifies the SLB of the session mismatch.

Non-Transitory Computer Readable Medium Embodiment 2. The non-transitory computer readable medium of Non-Transitory Computer Readable Medium Embodiment 1, wherein the SBC workers are implemented on a plurality of different nodes, at least some of said different nodes having different hardware capabilities.

As described above various features of the invention are applicable to determining/generating/calculating multi-metrics including resource utilization metrics, using the determined/generated/calculated multi-metrics for session load balancing and redirection (which could be internal or external) for example by a system with an SLB and a cluster of SBC Worker operating on Nodes of different types with different resource capabilities, and also using the multi-metrics to dynamically add Pods or applications such as SBC workers to proper Node types of the cluster (i.e., Nodes having the correct resources/capabilities for the type of application, e.g., SBC worker added), as well as using the determined multi-metrics to add or remove Nodes of specific types to or from a Cluster.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., sensors, call processing devices, gateways, session border, network nodes and/or network equipment devices, including a processor configured to implement one, multiple or all of the steps of one or more methods of the invention.

In some embodiments, the processor or processors, e.g., GPUs and/or CPUs, of one or more devices, e.g., computing nodes, are configured to perform the steps of the methods described as being performed by the computing nodes, e.g., SBC, SLB, DB. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node with a processor which includes a component corresponding to each of the steps of the various described methods performed by the device in which the processor is included. In some but not all embodiments a device, e.g., computing node, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., GPU or CPU, configured to implement some or all of the steps of the methods described herein. The processor may be for use in a computer node described in the present application.

Numerous additional variations on the methods and apparatus of the various embodiments described above will be apparent to those skilled in the art in view of the above description. Such variations and embodiments are to be considered within the scope of the invention.

What is claimed is:

1. A communications method, comprising:
receiving from a first device at a Signaling Front End Load Balancer (SLB) a first session initiation request destined for a second device;
making a first session load balancing decision at the SLB with respect to the received first session initiation request;
transmitting the first session initiation request to a first Session Border Controller (SBC) worker based on said first session load balancing decision, said first SBC worker being one of a plurality of SBC workers forming a cluster of SBC workers, wherein each of said SBC workers is implemented on a node, said first SBC worker being implemented on a first node and a second SBC worker of the cluster of SBC workers being implemented on a second node, said first node and said second node being different nodes;
making a session mismatch determination at the first SBC worker with respect to a first session corresponding to the first session initiation request;
when said session mismatch determination is that a session mismatch has occurred notifying the SLB of the session mismatch;
wherein said making said first session load balancing decision at the SLB with respect to the received first session initiation request includes: determining by the SLB to which SBC worker of the cluster of SBC workers to distribute the first session initiation request based on an expected traffic mixture to be processed by the SLB; and
wherein said expected traffic mixture includes: (i) a first percentage of total sessions to be processed which is expected to require signaling only processing, (ii) a second percentage of the total sessions to be processed which is expected to require media relay processing, and (iii) a third percentage of the total sessions to be processed which is expected to require transcoding processing.

2. The communications method of claim 1, wherein the SBC workers are implemented on a plurality of different nodes, at least some of said different nodes having different hardware capabilities.

3. The communications method of claim 2, wherein said determining by the SLB to which SBC worker of the cluster of SBC workers to distribute the first session initiation request is further based on hardware capabilities of the node on which each SBC worker is implemented.

4. The communications method of claim 2, wherein said determining by the SLB to which SBC worker of the cluster of SBC workers to distribute the first session initiation request is further based on reported session utilization values received from SBC workers of the cluster of SBC workers.

5. The communications method of claim 2,
wherein the first node has different hardware resources or capabilities than the second node.

6. The communications method of claim 1,
wherein the SLB is a Kubernetes POD; and
wherein the SBC workers of the cluster are Kubernetes PODs located on different Kubernetes nodes.

7. The communications method of claim 1,
wherein the SBC workers are implemented as native applications on a plurality of different nodes, said nodes being located in a cloud; and
wherein at least some of the different nodes have different hardware capabilities.

8. The communications method of claim 1,
wherein said first SBC worker makes said session mismatch determination based on hardware capabilities of the first node and an operation to be performed by the first SBC worker for the first session.

9. The communications method of claim 1,
wherein said making a session mismatch determination at the first SBC worker with respect to a first session corresponding to the first session initiation request includes: (i) determining by the first SBC worker that the first node does not have a Graphics Processing Unit for transcoding media, and (ii) determining by the first SBC worker that said first session requires media transcoding.

10. A communications system, comprising:
a Signaling Front End Load Balancer (SLB) entity executing on a node including a processor, said processor controlling the SLB entity to:
receive from a first device a first session initiation request destined for a second device;
make a first session load balancing decision at the SLB entity with respect to the received first session initiation request;
transmit the first session initiation request to a first Session Border Controller (SBC) worker based on said first session load balancing decision, said first SBC worker being one of a plurality of SBC workers forming a cluster of SBC workers, wherein each of said SBC workers is implemented on a node, said first SBC worker being implemented on a first node and a second SBC worker of the cluster of SBC workers being implemented on a second node, said first node and said second node being different nodes;
receive a notification of session mismatch from the first SBC worker when the first SBC worker makes a session mismatch determination with respect to a first session corresponding to the first session initiation request that a session mismatch has occurred with respect to the first session;
wherein said making said first session load balancing decision at the SLB entity with respect to the received first session initiation request includes: determining by the SLB entity to which SBC worker of the cluster of SBC workers to distribute the first session initiation request based on an expected traffic mixture to be processed by the SLB entity; and wherein said expected traffic mixture includes: (i) a first percentage of total sessions to be processed which is expected to require signaling only processing, (ii) a second percentage of the total sessions to be processed which is expected to require media relay processing, and (iii) a third percentage of the total sessions to be processed which is expected to require transcoding processing.

11. The communications system of claim 10, wherein the SBC workers are implemented on a plurality of different nodes, at least some of said different nodes having different hardware capabilities.

12. The communications system of claim 11, wherein said determining by the SLB entity to which SBC worker of the cluster of SBC workers to distribute the first session initiation request is further based on hardware capabilities of the node on which each SBC worker is implemented.

13. The communications system of claim 11, wherein said determining by the SLB entity to which SBC worker of the cluster of SBC workers to distribute the first session initiation request is further based on reported session utilization values received from SBC workers of the cluster of SBC workers.

14. The communications system of claim 11, wherein the first node has different hardware resources or capabilities than the second node.

15. The communications system of claim 11, wherein the communications system is a Kubernetes system;
wherein the node on which the SLB entity is executing is a Kubernetes node;
wherein the SLB entity is a Kubernetes POD; and
wherein the SBC workers of the cluster are Kubernetes PODs located on different Kubernetes nodes.

16. The communications system of claim 10, wherein the SBC workers are implemented as native applications on a plurality of different nodes, said nodes being located in a cloud; and
wherein at least some of the different nodes have different hardware capabilities.

17. The communications system of claim 10, wherein said first SBC worker makes said session mismatch determination based on hardware capabilities of the first node and an operation to be performed by the first SBC worker for the first session.

18. A non-transitory computer readable medium including a first set of computer executable instructions which when executed by a processor of a node including a Signaling Front End Load Balancer (SLB) entity cause the SLB entity to perform the steps of:
receiving from a first device at the SLB entity of the node a first session initiation request destined for a second device;
making a first session load balancing decision at the SLB entity with respect to the received first session initiation request;
transmitting the first session initiation request to a first Session Border Controller (SBC) worker based on said first session load balancing decision, said first SBC worker being one of a plurality of SBC workers forming a cluster of SBC workers, wherein each of said SBC workers is implemented on a node, said first SBC worker being implemented on a first node and a second SBC worker of the cluster of SBC workers being implemented on a second node, said first node and said second node being different nodes;
receiving a notification of session mismatch from the first SBC worker when the first SBC worker makes a session mismatch determination with respect to a first session corresponding to the first session initiation request that a session mismatch has occurred with respect to the first session;
wherein said making said first session load balancing decision at the SLB entity with respect to the received first session initiation request includes: determining by the SLB entity to which SBC worker of the cluster of SBC workers to distribute the first session initiation request based on an expected traffic mixture to be processed by the SLB entity; and
wherein said expected traffic mixture includes: (i) a first percentage of total sessions to be processed which is expected to require signaling only processing, (ii) a second percentage of the total sessions to be processed which is expected to require media relay processing, and (iii) a third percentage of the total sessions to be processed which is expected to require transcoding processing.

19. The communications method of claim 1, wherein said making a session mismatch determination at the first SBC worker with respect to the first session corresponding to the first session initiation request includes: making said mismatch determination based on information included in a first response message received by the first SBC worker for the first session.

20. The communications system of claim 15, further comprising:
a Kubernetes horizontal POD autoscaler that dynamically reconfigures the cluster of SBC worker Kubernetes PODs based on resource utilization metrics received from the SBC worker Kubernetes PODs of the cluster; and
a cluster autoscaler with labeling logic that determines whether or not one of the plurality of different nodes includes a label matching a label of a new POD request.

21. The communications system of claim 10, wherein said making a session mismatch determination at the first SBC worker with respect to the first session corresponding to the first session initiation request includes: making said mismatch determination based on information included in a first response message received by the first SBC worker for the first session.

* * * * *